United States Patent
Stretch et al.

(10) Patent No.: US 10,047,644 B2
(45) Date of Patent: Aug. 14, 2018

(54) DETECTION APPARATUS FOR AT LEAST ONE OF TEMPERATURE AND PRESSURE IN A CYLINDER OF AN INTERNAL COMBUSTION ENGINE

(71) Applicant: Eaton Corporation, Cleveland, OH (US)

(72) Inventors: Dale Arden Stretch, Novi, MI (US); John Albert Kovacich, Waukesha, WI (US); John Trublowski, Troy, MI (US); James Edward McCarthy, Jr., Kalamazoo, MI (US); Karen Evelyn Bevan, Northville, MI (US); Douglas J. Nielsen, Marshall, MI (US); David Yee, West Bloomfield, MI (US); Evan Grimm, Danbury, CT (US); Xubin Song, Canton, MI (US); Martin Pryor, Canton, MI (US)

(73) Assignee: Eaton Corporation, Cleveland, OH (US)

( * ) Notice: Subject to any disclaimer, the term of this patent is extended or adjusted under 35 U.S.C. 154(b) by 326 days.

(21) Appl. No.: 14/973,005

(22) Filed: Dec. 17, 2015

(65) Prior Publication Data
US 2016/0115830 A1    Apr. 28, 2016

Related U.S. Application Data

(63) Continuation of application No. PCT/US2014/051036, filed on Aug. 14, 2014.
(Continued)

(51) Int. Cl.
*F01L 3/08*    (2006.01)
*G01L 23/04*    (2006.01)
(Continued)

(52) U.S. Cl.
CPC ............... *F01L 3/08* (2013.01); *G01K 13/00* (2013.01); *G01L 23/04* (2013.01); *G01L 23/14* (2013.01);
(Continued)

(58) Field of Classification Search
CPC .......... F01L 2820/043; F01L 2820/044; F01L 2820/045; F01L 3/08; F02D 35/023;
(Continued)

(56) References Cited

U.S. PATENT DOCUMENTS

| 5,924,395 A | 7/1999 | Moriya et al. | |
|---|---|---|---|
| 6,622,675 B1 * | 9/2003 | Simpson | F01L 1/34 |
| | | | 123/90.15 |

(Continued)

FOREIGN PATENT DOCUMENTS

| EP | 1357259 A2 | 10/2003 |
|---|---|---|
| JP | 2002511120 | 4/2002 |
| JP | 2007063994 | 3/2007 |

OTHER PUBLICATIONS

International Search Report and Written Opinion for International Application No. PCT/US2014/051036 dated Oct. 31, 2014, 9 pages.

*Primary Examiner* — Freddie Kirkland, III
(74) *Attorney, Agent, or Firm* — RMCK Law Group PLC

(57) ABSTRACT

An apparatus for measuring at least one of temperature and pressure within a cylinder of an internal combustion engine can include an engine valve and a sensor. The internal combustion engine can include a valvetrain having rocker arm assembly, a camshaft, a valve, and a hydraulic lash adjuster. The engine valve can have a valve head and a valve stem extending from the valve head in an axial direction. The valve head can have a valve face configured to be in pressure communication with an engine cylinder. The valve stem can have an outer surface with a cylindrical portion and a variably-shaped portion. The variably-shaped portion can
(Continued)

define a target detectable by the sensor and the sensor can be installed adjacent to the target. Alternatively, the sensor can be positioned to detect a level of force at some point along the valvetrain.

15 Claims, 20 Drawing Sheets

Related U.S. Application Data

(60) Provisional application No. 61/866,663, filed on Aug. 16, 2013, provisional application No. 61/866,666, filed on Aug. 16, 2013, provisional application No. 61/873,591, filed on Sep. 4, 2013, provisional application No. 61/878,414, filed on Sep. 16, 2013.

(51) Int. Cl.
　　*G01L 23/14*　　(2006.01)
　　*G01K 13/00*　　(2006.01)
　　*G01M 15/08*　　(2006.01)
　　*F02D 35/02*　　(2006.01)

(52) U.S. Cl.
　　CPC ....... *G01M 15/08* (2013.01); *F01L 2820/043* (2013.01); *F01L 2820/044* (2013.01); *F01L 2820/045* (2013.01); *F02D 35/023* (2013.01); *F02D 35/025* (2013.01); *G01K 2205/00* (2013.01)

(58) Field of Classification Search
　　CPC .. F02D 35/025; G01K 13/00; G01K 2205/00; G01L 23/04; G01L 23/14; G01M 15/08
　　See application file for complete search history.

(56) References Cited

U.S. PATENT DOCUMENTS

| | | | |
|---|---|---|---|
| 7,063,057 B1 * | 6/2006 | Waters | F01L 1/022 |
| | | | 123/346 |
| 8,096,170 B2 * | 1/2012 | Mayrhofer | G01L 23/24 |
| | | | 73/114.16 |
| 8,151,636 B2 * | 4/2012 | Siraky | F15B 15/2884 |
| | | | 73/114.28 |
| 8,505,365 B2 * | 8/2013 | Stretch | G01L 9/0089 |
| | | | 73/114.18 |
| 9,284,859 B2 * | 3/2016 | Nielsen | F01L 1/185 |

* cited by examiner

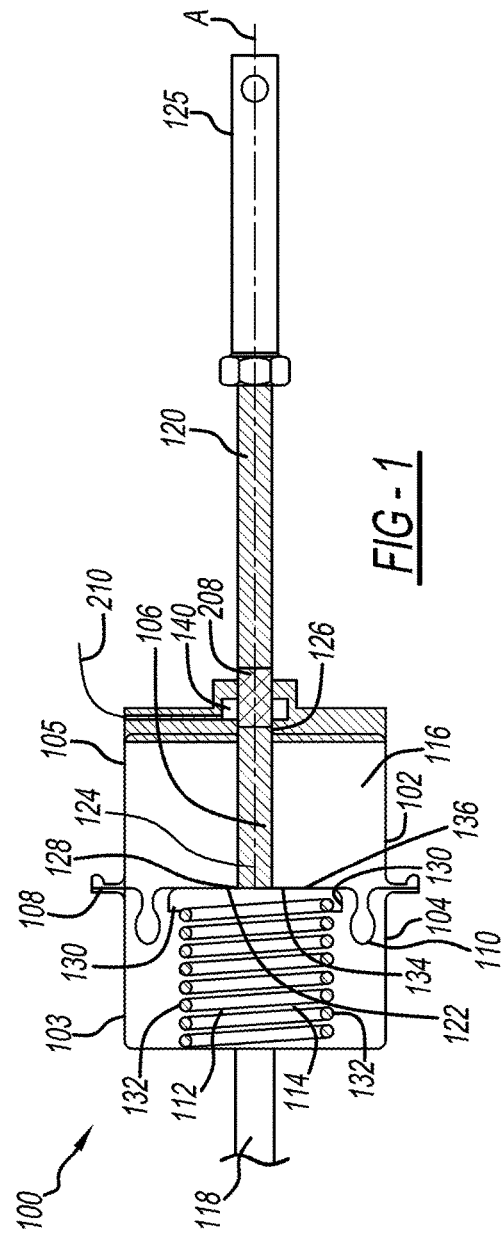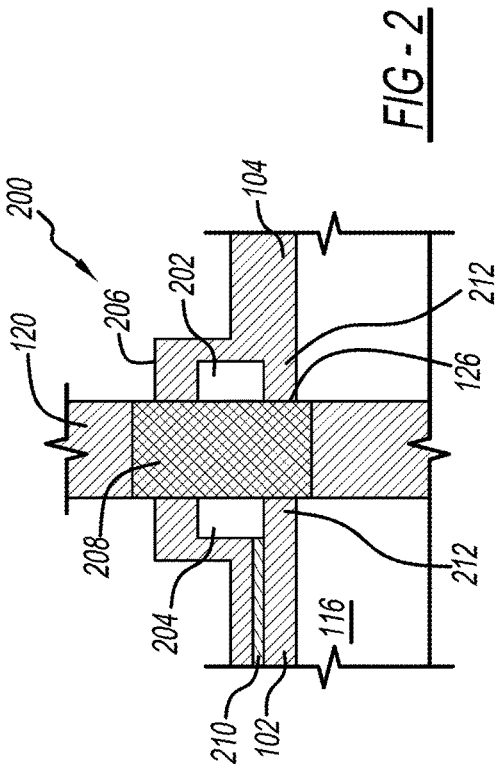

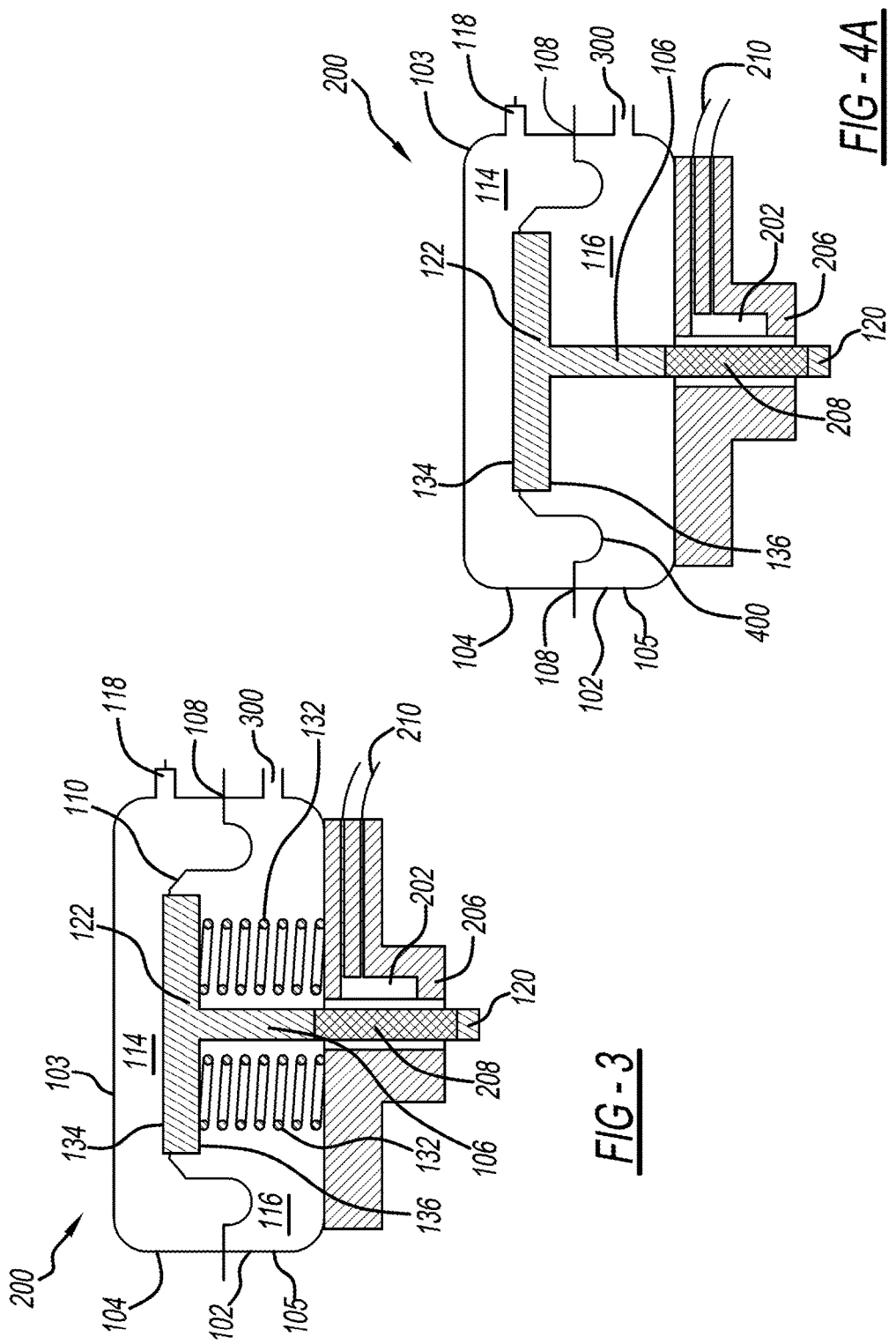

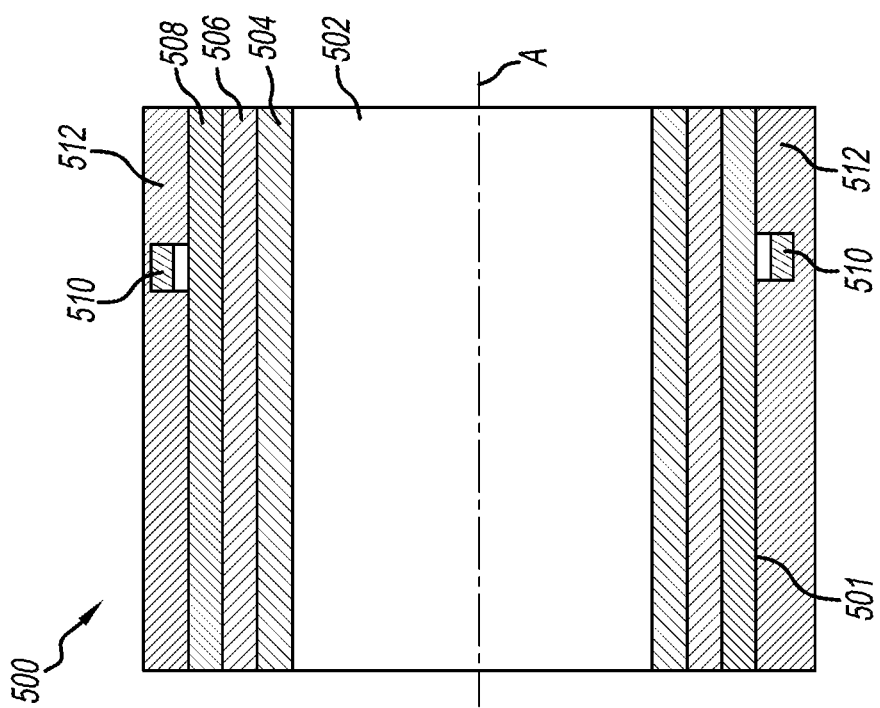
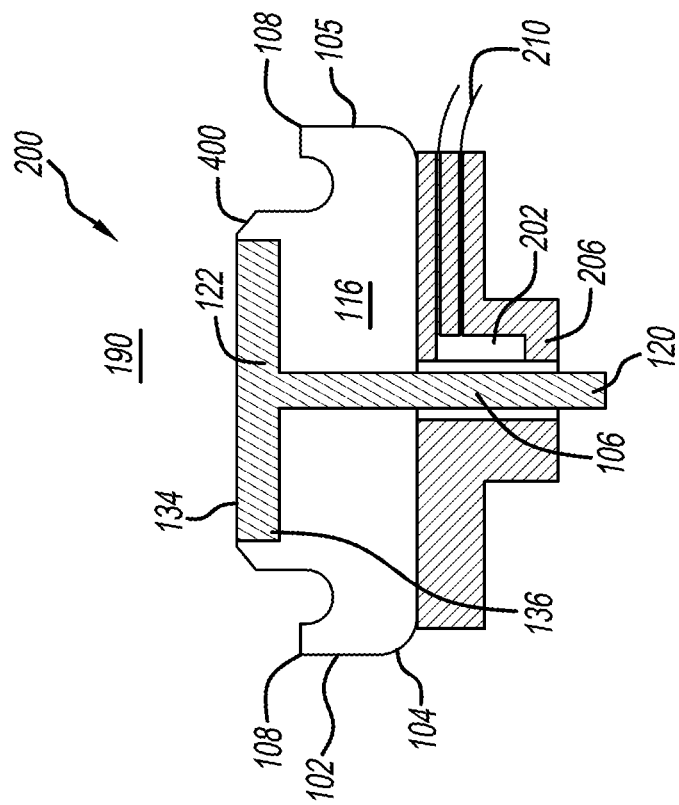

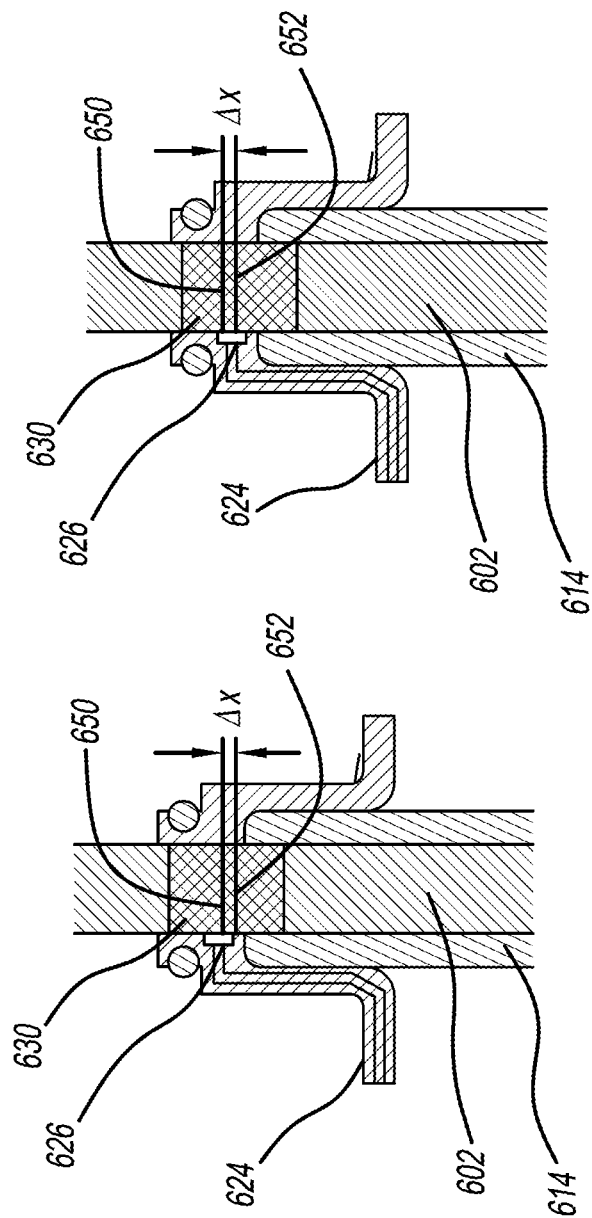

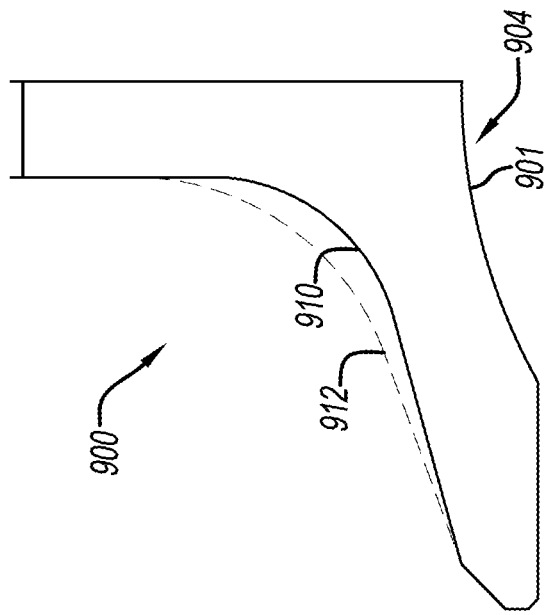
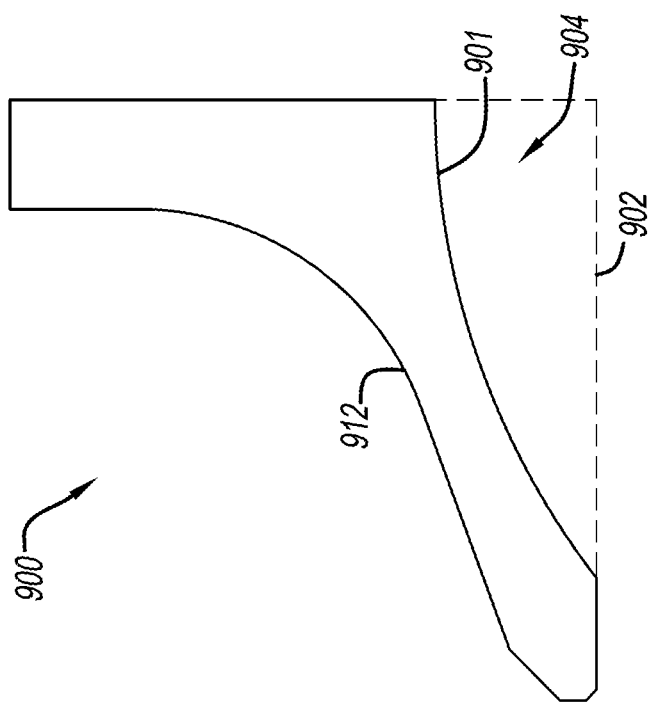

DETECTION APPARATUS FOR AT LEAST ONE OF TEMPERATURE AND PRESSURE IN A CYLINDER OF AN INTERNAL COMBUSTION ENGINE

CROSS-REFERENCE TO RELATED APPLICATIONS

This application is a continuation of International Patent Application No. PCT/US2014/051036 filed on Aug. 14, 2014, which claims the benefit of U.S. Patent Application No. 61/866,663 filed on Aug. 16, 2013, U.S. Patent Application No. 61/866,666 filed on Aug. 16, 2013, U.S. Patent Application No. 61/873,591 filed Sep. 4, 2013 and U.S. Patent Application No. 61/878,414 filed on Sep. 16, 2013. The disclosures of the above applications are incorporated herein by reference.

FIELD

The present disclosure relates generally to temperature and pressure detectors and more particularly to temperature and pressure detectors for cylinders of internal combustion engines.

BACKGROUND

Indirect measures of pressure, temperature and other thermodynamic characteristics of systems are useful in many contexts and are used in numerous everyday applications. In internal combustion engines, knowledge of the instantaneous pressure and temperature in an engine cylinder assists in the management of parameters that effect engine efficiency and pollution emission, such as variable valve timing, lean burn and minimum timing for optimum torque.

The background description provided herein is for the purpose of generally presenting the context of the disclosure. Work of the presently named Inventors, to the extent it is described in this background section, as well as aspects of the description that may not otherwise qualify as prior art at the time of filing, are neither expressly nor impliedly admitted as prior art against the present disclosure.

SUMMARY

An apparatus for measuring at least one of temperature and pressure within a cylinder of an internal combustion engine can include an engine valve and a proximity sensor. The engine valve can have a valve head and a valve stem extending from the valve head in an axial direction. The valve head can have a valve face configured to be in pressure communication with an engine cylinder. The valve stem can be configured to extend through an opening in a valve guide secured to an engine block of the internal combustion engine. The valve stem can have an outer surface with a cylindrical portion and a variably-shaped portion. The proximity sensor can be installed in the internal combustion engine adjacent to the variably-shaped portion of the outer surface of the valve stem. The proximity sensor can be configured to detect axial displacement of the valve stem resulting from one of a change in temperature of the valve stem and a change in pressure acting on the valve face.

According to additional features, the variably-shaped portion can be a series of grooves arranged in the axial direction along a length of the valve stem. At least some of the series of grooves can be triangular in cross-section. At least some of the series of grooves can be square in cross-section. A quantity of filler material can be disposed in the series of grooves and arranged to blend with the cylindrical portion of the valve stem. The quantity of filler material can have a magnetic permeability substantially equal to one and the stem can have a magnetic permeability greater than one. Alternatively, the quantity of filler material can have a magnetic permeability greater than one and the stem can have a magnetic permeability substantially equal to one. Alternatively, the quantity of filler material and the stem can both have a magnetic permeability greater than one but different from one another. The variably-shaped portion can be at least one frustoconical section along a length of the valve stem.

An apparatus for measuring at least one of temperature and pressure within a cylinder of an internal combustion engine can include an engine valve and a sensor assembly. The engine valve can have a valve head and a valve stem extending from the valve head in an axial direction. The valve head can have a valve face configured to be in pressure communication with an engine cylinder. The valve stem can be configured to extend through an opening in a valve guide secured to an engine block of the internal combustion engine. The valve stem can have first and second diameter portions with a shoulder defined between the first and second diameter portions. The sensor assembly can be installed in the internal combustion engine adjacent to the shoulder of the valve stem. The sensor assembly can be configured to detect axial displacement of the valve stem resulting from one of a change in temperature of the valve stem and a change in pressure acting on the valve face.

According to additional features, the sensor assembly can include one of a pressure sensor and a force sensor, a plate, and a spring. The pressure or force sensor can be spaced from the shoulder. The plate can be positioned to engage the shoulder. The spring can be positioned between the plate and the sensor.

According to other features, the pressure or force sensor, the spring, and the plate can encircle the valve stem. The plate can continuously contact the shoulder. Alternatively, the plate can intermittently contact the shoulder. The valve stem can be moveable over a predetermined range of axial movement and the spring can be sized to be compressible over the entire predetermined range.

An apparatus for measuring pressure of a combustion chamber in an internal combustion engine can include a sensor. The internal combustion engine can include a rocker arm assembly, a camshaft, a valve and a hydraulic lash adjuster. The sensor can measure a force exerted on the valve during combustion and can output a signal. The signal can be correlated to pressure within the combustion chamber.

According to additional features, the sensor can be arranged between the hydraulic lash adjuster and an engine structure. The sensor can be arranged between the hydraulic lash adjuster and the rocker arm assembly. The sensor can be arranged upon a roller of the rocker arm assembly. The sensor can be arranged between the rocker arm assembly and the valve.

BRIEF DESCRIPTION OF THE DRAWINGS

The present disclosure will become more fully understood from the detailed description and the accompanying drawings, wherein:

FIG. 1 is a cross-sectional view of an exemplary displacement detection device constructed in accordance to one example of the present disclosure;

FIG. 2 is an enlarged portion of FIG. 1;

FIGS. 3, 4A and 4B are cross-sectional views of alternative displacement detection devices constructed in accordance to other examples of the present disclosure;

FIG. 5 is a cross-sectional view of a magnetically encoded actuator shaft constructed in accordance to another example of the present disclosure;

FIGS. 6A and 6B are enlarged portions of FIG. 6 adjacent to sensor 601;

FIGS. 9A and 9B are profiles of alternative valve heads constructed in accordance to other examples of the present disclosure;

DETAILED DESCRIPTION

Figure 6:
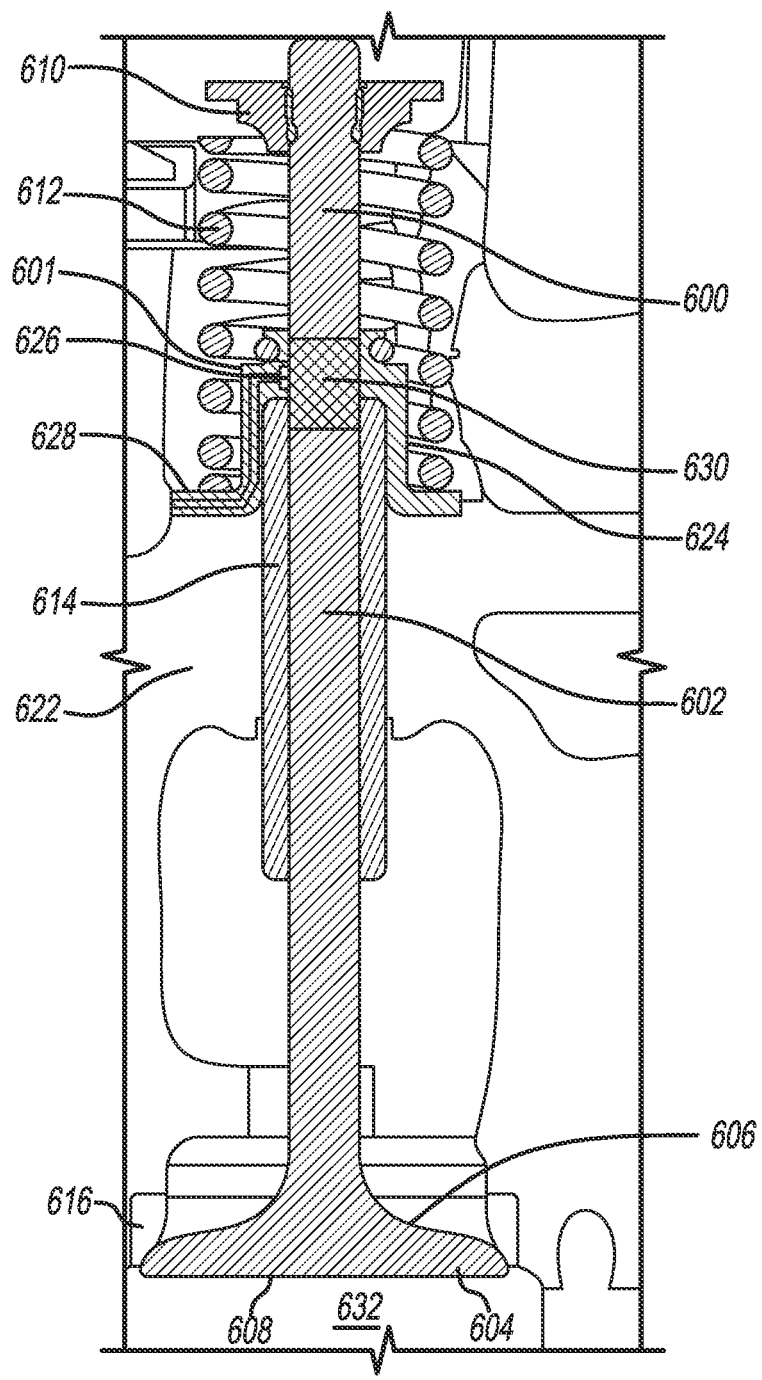
FIG. 6 is a cross-sectional view of a displacement detection device constructed in accordance to another example of the present disclosure.

There is demand in the automotive industry for pressure sensors that can monitor internal combustion engines to determine the pressure and temperature within a combustion chamber. By accurately monitoring and controlling the pressure and temperature in the combustion chamber, engine efficiency can be raised and the fuel consumption and pollutant emissions can be reduced. Also, cylinder temperature and pressure monitoring would assist in inhibiting knocking and misfire and also assist in controlling variable valve timing, minimum timing for best torque, lean burn, and other engine operating characteristics.

FIG. 1 illustrates a cross-sectional view of an exemplary displacement detection device 100 according to the present disclosure. A housing 102 has a housing wall 104 formed by a first and second housing members 103, 105 joined at pressure-tight seam 108. A deformable member 110, which may take the form of a diaphragm, and may for example be made of rubber, plastic or metal, is sealed between the first and second housing members 103, 105. The deformable member 110 separates the cavity 112 formed by the housing wall 104 into two chambers: a first chamber or pressure chamber 114 and a second chamber 116. The pressure chamber 114 is in pressure communication with a pressure source (not shown) through tap 118. In one aspect of the present teachings illustrated in FIG. 1, the housing wall 104, along with the deformable member 110, form the pressure chamber 114. In another aspect of the present teachings, the pressure chamber 114 may for example be enclosed by a distinct chamber wall separate from the housing wall 104. In yet another aspect of the present teachings, the second chamber 116 could serve as the pressure chamber.

An actuator 106 can comprise an actuator shaft 120 that extends along axis A from the first end 124 to the second end 125 of actuator 106. For purposes of this disclosure, the terms "axial," "axially" will be understood to refer to the direction lying along the longitudinal axis A of the shaft 120. The actuator 106 can have a push plate 122 at the first end 124. The push plate 122 can be sealed against the deformable member 110 to prevent leakage from the pressure chamber 114. The shaft 120 can extend from the push plate 122 through a deformable member aperture 128, extending outside of the cavity 112 through a shaft aperture 126 in the housing 102. The push plate 122 can have a U-shaped cross-section, as it can have a continuous lip 130 around its outer perimeter. The lip 130 can protect the deformable member 110 from damage that could otherwise occur from contact with a sharp edge at the perimeter of the push plate 122. As seen in FIG. 1, the push plate 122 can be located within the pressure chamber 114. The push plate 122 can have a first face 134 facing in the direction away from the actuator 106, in this case toward the pressure chamber 114, and an opposing second face 136 that forms the seal with the deformable member 110. A sensor 140 can be secured to the housing wall 104 adjacent the shaft aperture 126. The sensor 140 can be sensitive to a magnetic field, and may be a non-contacting Hall-effect sensor or a magnetoresistive sensor. As described below, a sensor 200 shown in FIG. 2 can also be configured to send electrical signals corresponding to the displacement of a target through sensor wires 210. Instead of sensing a magnetic field, it should be appreciated that the sensors 140 and 200 can be configured to sense other characteristics of a target, as described more fully below.

One or more sensor springs 132 can be secured at one end to the push plate 122, and at the opposite end to the housing wall 104. In FIG. 1, the spring 132 is secured to the portion of the housing wall 104 that forms pressure chamber 114. The sensor spring 132 can serve to provide an axial force in direction opposite to the direction that the push plate 122 is displaced from equilibrium in the axial direction A.

In FIG. 1, the push plate 122 and deformable member 110 can be in pressure communication with the pressure chamber 114. When an increase in pressure is applied to the pressure chamber 114 through the tap 118, the push plate 122 and deformable member 110 can be displaced in the in the axial direction A toward the second end 125 of the actuator 106. This can expand the volume of the pressure chamber 114 and decrease the volume of the second chamber 116. The axial motion of the push plate 122 can cause the shaft 120 to move axially through the shaft aperture 126 of the housing 102. The sensor spring 132 can pull on the push plate 122 and inhibit the growth in the volume of the pressure chamber 114.

FIG. 2 illustrates the sensor 200 secured to the housing wall 104 at the shaft aperture 126 of the device 100 shown in FIG. 1. The shaft 120 can move axially relative to the sensor 200. In one aspect of the present teachings, pressure seals such as referenced at 212 can assist in maintaining pressure in cavity 112, such as where a sensor mount 206 is secured to the portion of the housing wall 104 adjacent to the pressure chamber 114. The sensor 200 can have two magnetic sensor pickups 202, 204 that are secured to the rigid sensor mount 206. The rigid sensor mount 206 can be secured to the housing wall 104 and hold the sensor pickups 202, 204 stationary relative to the housing 102. Holding the sensor pickups 202, 204 stable with respect to the sensor housing 102 can assist in the accuracy of measurements taken by the sensor 200. As will be described further below, the magnetic sensor pickups 202, 204 can be located adjacent a magnetic target 208 disposed at a fixed position on the shaft 120. The pickups 202, 204 can detect small axial displacements of the target 208 and therefore of the shaft 120. The sensor 200 can be configured to send electrical signals corresponding to the displacement of the target 208 through sensor wires 210.

FIGS. 3, 4A and 4B illustrate additional aspects of the present teachings. In FIG. 3, the sensor springs 132 are not shown as located in the pressure chamber 114. Instead, the springs 132 can be secured to the second face 136 of the push plate 122 at one end and to the portion of the housing wall 104 that forms second chamber 116 at the other end. A vent 300 can allow the second chamber 116 to maintain constant pressure even as the volume of the second chamber 116 changes as a result of the motion of the deformable member 110 and the push plate 122. As also shown in FIG. 1, the sensor springs 132 can provide an axial force opposite the direction the push plate 122 displaces the springs 132 from an equilibrium position. A single sensor pickup 202 can be secured to the housing 102 by rigid sensor mount 206. In yet another alternative shown in FIG. 4A, the springs 132 can be removed and replaced by a resilient deformable member 400 that responds to axial displacement by exerting a force in the direction opposite the displacement.

FIG. 4B shows a modified version of the sensor 200 in FIG. 4A. In FIG. 4B, the housing 102 can comprise a second housing member 105 joined at pressure-tight seam 108 to a resilient deformable member 400. In this sensor 200, the resilient deformable member 400 can separate the second chamber 116 from a volume 190 of, for example a liquid or gas, that has a measurable pressure. Examples of such volumes 190 are local atmospheric gas and cylinders of an internal combustion engine. The actuator 106 can be in pressure communication with the volume 190, and can be pressure sealed against the push plate 122. The sensor 200 can thus measure the pressure of the volume 190 by detecting the movement induced in the shaft 120 caused by, for example, the pressure difference between the volume 190 and chamber 116. In yet another aspect of the present teachings, the actuator 106 may function as a resiliently deformable member 400. An example of such is the pressure seal of an engine valve secured against a valve seat during cylinder combustion. In sensors where a metal actuator 106 is pressure sealed, for example to a housing 102, and acts as resilient deformable member 400, the deformation will be small.

FIG. 5 illustrates a cross-sectional view of an actuator shaft 500 upon which a target 501 has been placed according to the present disclosure. As illustrated in FIG. 5, the shaft 500 is generally cylindrical and has a core 502. The core 502 may be made of magnetic material, such as plain carbon or alloy steels; partially magnetic materials such as austenitic stainless steels; or non-magnetic materials such as aluminum, titanium, polymers and composites. In the one aspect of the present teachings, a nickel isolation layer 504 is placed over the core. A nickel-cobalt magnetic layer 506 is disposed over the isolation layer 504. Finally, an optional protective layer 508, for example electroplated hard chromium (EHC), is disposed over the magnetic layer 506.

The isolation layer 504 is preferably made of a magnetic flux trapping alloy such as nickel phosphorus, which can improve detection by sensor pickups 510. Preferably, the isolation layer 504 is deposited by an electroless nickel plating process. The thickness of the isolation layer 504 can be approximately 15 microns and can be substantially uniform in thickness over the target 501 area. Standard electroplating techniques can be used to deposit the nickel-cobalt magnetic layer 506. The thickness of layer 506 can be approximately 15 to 20 microns. A number of alternative materials like Co—Ni—P, Co—W, Co—Cr and others can be utilized to form the magnetic layer 506. An alternative to the use of plated coatings is to use the base material(s) of the shaft 500 directly as the magnetic media. This eliminates the need for an isolation layer coating, a magnetic layer and a protective layer. A number of Co—Cr—Fe and Co—Ni—Cr—Fe alloys are suitable as magnetic media and also can be used as a valve or valve stem material.

The magnetic layer 506 can allow information to be recorded onto the shaft 500 using standard magnetic recording methods, thereby magnetically encoding the shaft 500 with information that allows the sensor pickups 510 to detect the position of the shaft 500. The sensor pickups 510 can be sensitive to magnetic flux, and as described above, the sensor pickups 510 can be fixed relative to the moveable shaft 500, for example by fixing the pickups 510 to a mount 512 that remains fixed relative to the shaft 500. As shown in FIG. 5, the pickups 510 can be physically spaced from the magnetically encoded shaft 500, instead are mounted near the shaft 500. The magnetic encoding layer 506 need not be placed along the entirety of the shaft 500, but may be limited to portions of the shaft 500 that may be detected or read by the pickups 510 during operation of the device, for example as with target 208 shown in FIGS. 1 and 2.

Various methods of encoding the shaft 500 may be used according to the present disclosure, as described more fully in reference to FIGS. 11-16. Further, coding techniques and approaches other than magnetic coding can be applied in one or more embodiments of the present disclosure. In one example, evenly-spaced magnetic domains are recorded along the axial direction of the shaft 500. The pickups 510 are able detect each passing domain, and are thereby able to provide this information to connected circuitry (not shown). The circuitry can then readily obtain the distance traveled by the shaft 500 by counting the number of passing domains. The pressure being monitored, such as in a chamber or a volume, can be calculated as a function of the distance traveled by the shaft 500. By providing the circuitry with the relationship between the relative position of the shaft 500 and the corresponding pressure in the pressurized chamber 114 shown, for example, in FIGS. 1, 3 and 4A, information provided by the sensors 200 can be processed by the circuitry to determine the amount of pressure in a pressure chamber 114 or a volume 90. Such relationships can be represented by tables stored in a computer memory matching the signals provided by the sensors 200 to the amount of displacement, and correspondingly to the amount of pressure.

Under certain circumstances, the protective layer 508 and/or the nickel isolation layer 504 may not be necessary. For example, where the magnetic layer 506 is sufficiently hard and/or durable, the protective layer 508 may not be necessary. In another example, where the magnetic layer 506 provides signal of sufficient strength to the pickups 510 without the benefit of an isolation layer 504, the isolation layer 504 may be omitted.

FIG. 6 illustrates a cross-sectional view of a valve 600, which may be either an exhaust valve or intake valve, and which has a valve stem 602 and a head 604, with a transition 606 between the stem 602 and head 604, and a valve face 608. As shown in FIG. 6, the valve works in combination with several common valvetrain components, such as the valve retainer 610, the valve spring 612, the valve guide 614 and the valve seat 616. The valve seat 616 and valve guide 614 can both be secured to the cylinder head 622 of the internal combustion engine (not shown). The valve guide 614 and/or valve seat 616 may in certain circumstances be integrated into the internal combustion engine.

As shown in FIG. 6, a rigid sensor mount 624 holding sensor 601 can be secured to the cylinder head 622 and a portion of the valve guide 614. The rigid mount 624 can surround the portion of the stem 602 that extends from the top of valve guide 614, which is located distally relative to a chamber of a cylinder 632. A magnetic sensor pickup 626 of a sensor 601 can be secured within the rigid sensor mount 624. Wire 628 can run from the pickup 626 to transmit electrical signal corresponding to the coding detected by the pickup 626. A target 630, such as made for example by depositing an isolation layer 504, magnetic layer 506 and protective layer 508 according to the description associated with FIG. 5, is located on at least the portion of the stem 602 that is adjacent the pickup 626 when the valve is closed (i.e. when the valve head 604 is in contact with valve seat 616).

Figures 7A, 7B, 7C, 7D:
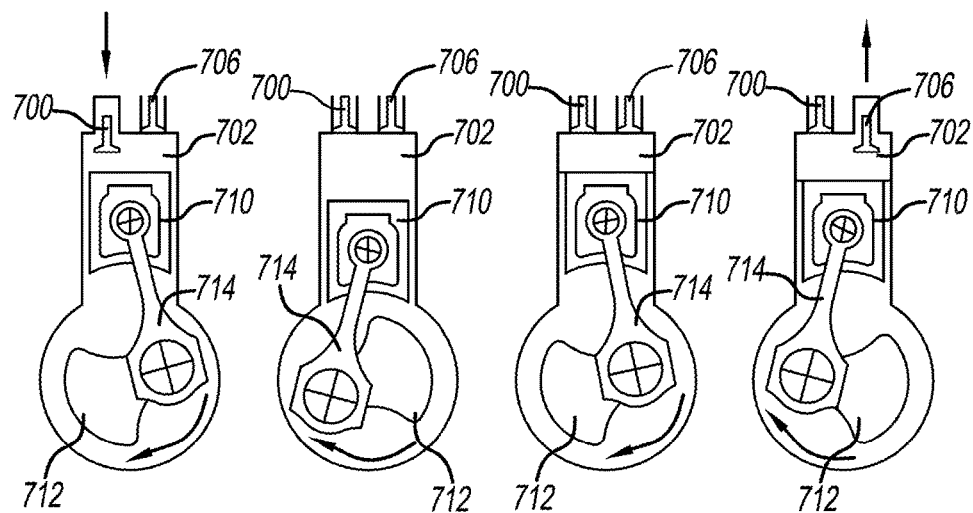
FIGS. 7A-7D are schematic views of an engine cylinder during an engine cycle.

Pressure and temperature in the cylinder 632 vary during operation of the engine. FIGS. 7A-7D, illustrate four stages of an engine cycle in a typical cylinder 702 having an intake valve 700, exhaust valve 706, piston 710, a crank 712, connection rod 714. In FIG. 7A, which represents the suction stroke, the intake valve 700 is open, allowing air to enter the cylinder 702. When the piston 710 is at its lowest point, the intake valve closes and piston 710 moves upward toward its highest point during the compression stroke to increase the pressure in the cylinder 702, as shown in FIG. 7B. By introducing fuel into the cylinder 702 and igniting it, the pressure in the cylinder 702 increases greatly over a very short time interval, creating a downward force on the piston 710. During the working stroke shown in FIG. 7C, the piston 710 moves downward again toward its lowest point. As shown in FIG. 7D, during the exhaust stroke the exhaust valve 706 is open and the upward movement of piston 710 expels the exhaust gasses from the cylinder 702. The temperature in cylinder 702 will also vary as the pressure changes, and as combustion occurs in the cylinder 702.

Figure 8:
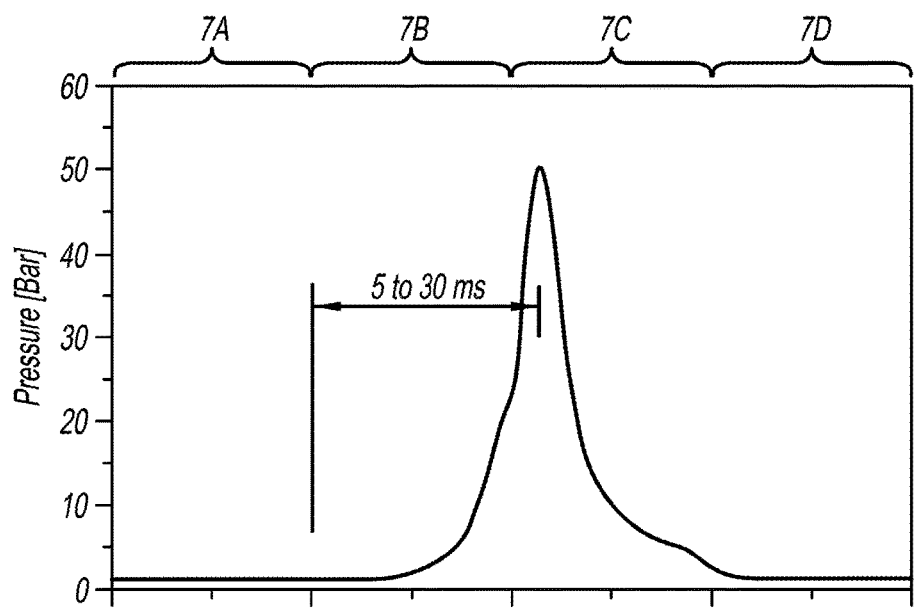
FIG. 8 is a graph of the pressure in an engine cylinder over the stages of the engine cycle shown in FIGS. 7A-7D.

FIG. 8 illustrates the changes in the pressure in the cylinder during an engine cycle. The left vertical axis reflects pressure in the cylinder in bars, while the horizontal axis represents time, the entirety of the horizontal axis representing a duration of one cycle. The intervals marked 7A-7D correspond to the stages shown in FIGS. 7A-7D: the suction stroke, the compression stroke, the working stroke and the exhaust stroke, respectively. As shown in FIG. 8, the pressure in the cylinder increases from less than 5 bars to approximately 50 bars from the beginning of the compression stroke to beginning of the working stroke where the pressure reaches a maximum cycle value. Such a change occurs over a time span ranging from approximately 5 to 30 milliseconds.

Referring again to FIG. 6, the valve 600 can be closed during the compression and working strokes. At these points in time, the valve 600 can be securely pressed against the valve seat 616, and pressure in the cylinder 632 can apply an axial force against the face of valve 608. This axial force can cause the valve head 604 to deform slightly. This slight axial deformation of the valve head 604 is elastic in nature, causing the valve stem 602 to temporarily move in the axial direction, and return once the pressure is released. This axial motion can be detected by the pickup 626 as the target 630 moves past the pickup 626. The wire 628 can carry electrical signal to circuitry (not shown) corresponding to the amount of relative motion of the stem 602. Importantly, the valve head 604 can deform by an amount dependent on the amount of pressure in the cylinder 632. Thus, by providing the circuitry with the relationship between the amount of axial displacement with the corresponding amount of pressure in the cylinder 632 required to cause the particular amount of displacement, the circuitry can provide the pressure level in the cylinder 632. Such relationships can be represented by tables matching the signals provided by the sensors 200 to the amount of displacement, and correspondingly to the amount of pressure in the cylinder 632. Such relationships will also necessarily depend on the design parameters of the system (e.g., the material comprising the valve head 604, the size and shape of the valve head 604, and the sensitivity of the pickups 626).

In addition to pressure, the temperature of the engine may also be measured according to the present disclosure. FIGS. 6A and 6B are close-up views of stem 602 shown in FIG. 6 taken at different points in time while the engine warms up. FIGS. 6A and 6B show a close-up of the portion of stem 602 adjacent to sensor pick up 626. FIG. 6A illustrates stem 602 immediately after engine startup, before the engine has had sufficient time to warm-up. FIG. 6B illustrates the same portion of stem 602 shown in FIG. 6A at a later point in time during engine operation. In FIG. 6B, the engine has reached steady-state operating temperature. Like the valve in FIG. 6A, the valve in FIG. 6B is in a closed position. First axial reference 650 and second axial reference 652 correspond to absolute magnetic encodings disposed on stem 602. In FIG. 6A, pickup 626 reads the coding at reference 650. Over time, the temperature of the engine increases, increasing the temperature of components in the engine, including valve 600. As stem 602 heats up it increases in total length. As a result of this expansion, stem 602 shown in FIG. 6B undergoes an elastic distortion, lengthening by an amount Δx in the axial direction at the location being read by sensor pickup 626. As shown in FIG. 6B, after stem 602 has lengthened, pickup 626 no longer reads the coding at reference 650 when the valve is closed, but instead reads coding at reference 652. As described above, the sensor 601 can provide information to circuitry to determine the value of the change in the length Δx of stem 602 at pickup 626, and also determine the temperature of the engine based on the value of Δx, for example by referencing a table providing the temperature corresponding to various values of Δx.

The foregoing structure may also be implemented with relative encoding instead of absolute encoding. In addition, finer temperature changes than that occurring between engine startup and equilibrium temperatures may be measured according to the present disclosure. For example, the changes in temperature occurring between an engine operating in a high speed environment versus one in stop-and-go traffic can be determined with coding having a sufficient resolution to detect the relative lengthening of stem 602 between these two temperatures. Yet finer temperature resolution may also be achieved. In one aspect of the present teachings, the encoding on target 630 has a resolution of about 3 to 10 micrometers, most preferably about 3 micrometers.

Maximizing the axial motion imparted to the stem 602 by a particular pressure level in the cylinder without compromising the durability of the valve 600 is advantageous. For a particular resolution level of the sensor pickup 626, increasing the number of domains that pass the pickup 626 for any particular pressure level detected, for example, increases the accuracy of the sensor 601.

Several different valve head shapes may improve the amount of displacement without significantly compromising the strength and durability of the valve head 900. FIGS. 9A and 9B illustrate some profiles of alternative valve head designs. In FIG. 9A, a concave valve face 901 is shown relative to a standard valve face 902. In FIGS. 9A and 9B, the recess 904 is an arcuate cross-sectional shape; however, the recess 904 may take other shapes. In other aspects of the present teachings, the recess 904 may be conical. Additional shapes are also suitable for the recess 904. FIG. 9B illustrates a valve head 900 according to the present disclosure having a recessed transition region 910 compared to a standard transition region 912. The recessed transition region 910 allows for increased deformation of the valve head 900 relative to the standard transition region 910. The shape of the illustrated transition region 910 is chosen to minimize the stress caused to the valve head 900 by the deformation, but yet maximize the head 900 deflection. Preferably, the shape of the transition region 910 is chosen to create stress levels that are as uniform as possible over the valve head 900, and therefore avoiding scenarios where the valve head 900 has high stress and low stress regions, while still creating the maximum amount of deformation in the valve head 900. Materials suitable for valve head 900 construction are steel, and most preferably titanium.

Figures 10A, 10B:
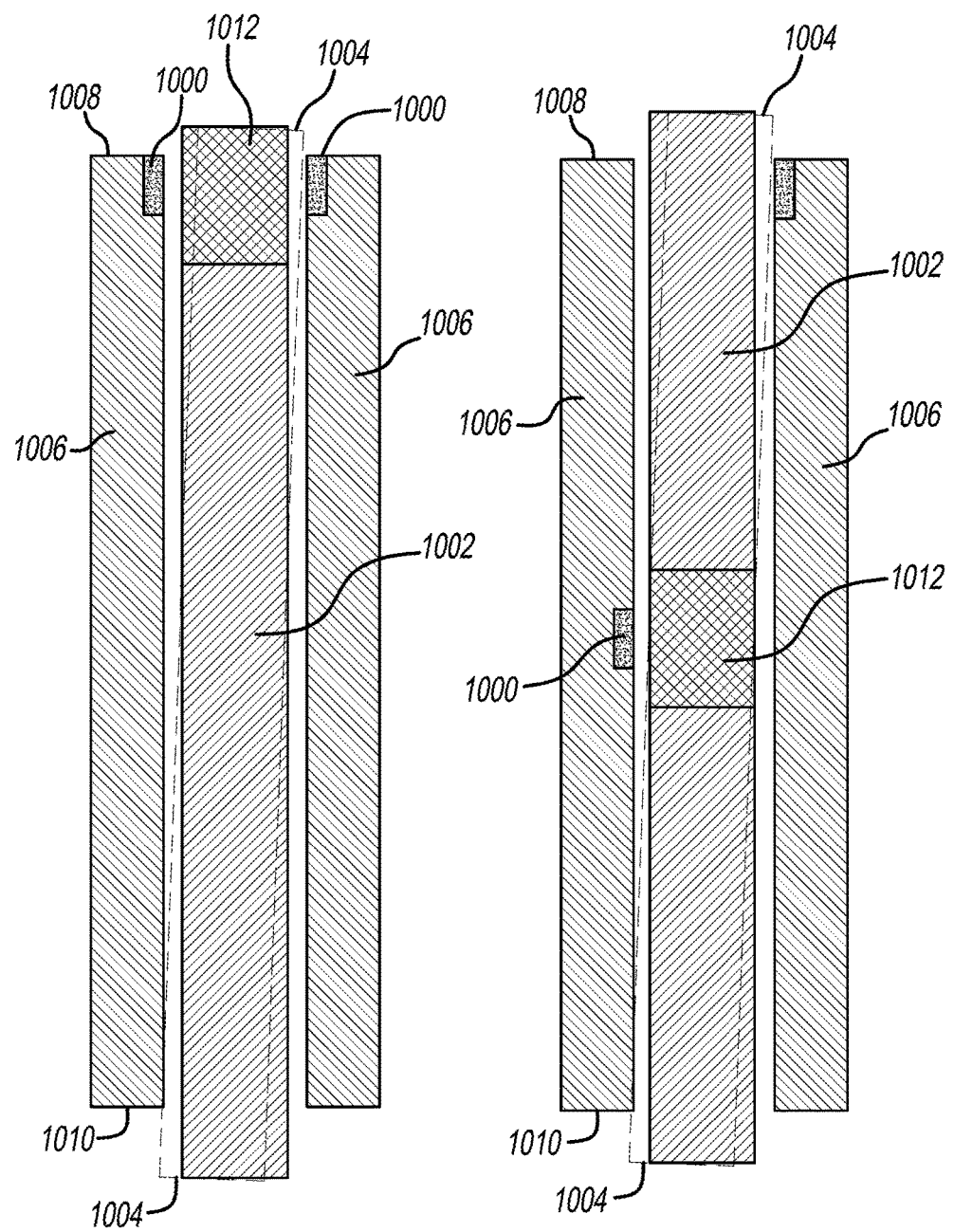
FIGS. 10A and 10B are cross-sectional views showing alternative placements for one or more sensor pickups in accordance to other examples of the present disclosure.

FIGS. 10A and 10B show alternative placements for one or more sensor pickups 1000, shown here secured within a valve guide 1006. During normal operation, the valve stem 1002 undergoes non-axial motion, such as shown by the outline 1004 in FIGS. 10A and 10B. In FIG. 10A, two sensor pickups 1000 are placed on opposing sides of the valve stem 1002 at the top of the valve guide 1006, at the distal end relative the cylinder. At this location, the valve stem 1002 can exhibit relatively greater amounts of motion than, for example, the portion of the valve stem 1002 located substantially equidistant between the first end 1008 and second end 1010 of the valve guide 1006, which exhibits minimal non-axial motion. Such motion has potential to increase the distance between a sensor pickup 1000 and a magnetic target 1012, which can impair the ability of the pickup 1000 to detect the magnetic target 1012. In order to compensate for the increased tilting motion of the valve stem 1002 near the end of the valve guide 1006, the sensor pickups 1000 can be secured to the valve guide 1006 adjacent opposing sides of the valve stem 1002. Thus, as the valve stem 1002 moves away from one of the pickups 1000, it will move closer to the other pickup 1000. As the valve stem 1002 tilts in this way, the pickup 1000 closer to the valve stem 1002 will detect a downward movement, while the pickup 1000 further from the valve stem will detect an upward motion, thus mitigating the effects of the non-axial motion. Circuitry (not shown) can be configured to mitigate the effects of the tilting by averaging the number of magnetic domains detected by the two pickups 1000, which will serve to isolate axial motion from non-axial motion such as tilting of the valve stem 1002. In another example, circuitry can be configured to compensate for axial motion caused by titling by detecting signal strength, which will be dependent on the distance of the valve stem 1002 to the pickups 1000. The circuitry can store information regarding the relationship between signal strength and amount of tilting, and the resulting amount of adjustment to the detected axial motion is necessary.

The configuration shown in FIG. 10B illustrates another alternative configuration for the pickup 1000. In one aspect of the present teachings, a single pickup 1000 can be secured to the valve guide 1006 substantially equidistant between the first end 1008 and second end 1010 of the valve guide 1006. Due to the minimal non-axial motion of the stem 1002 at this location, a second pickup 1000 as illustrate can be optional. The target 1012 is located adjacent the pickup 1000. In general, the pickups 1000 may be placed at any location along the valve guide 1006.

Figures 11, 12:
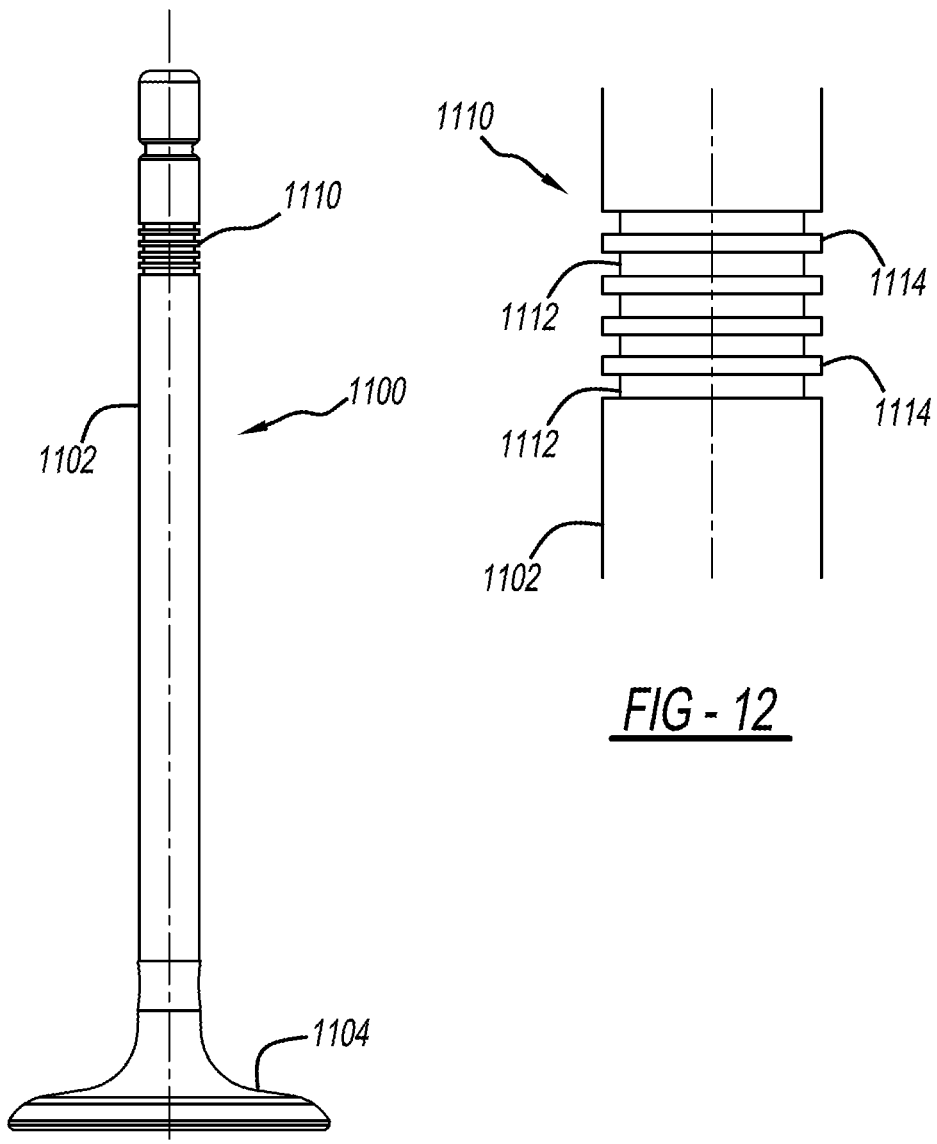
FIG. 11 is a side view of a valve having a sensor target constructed in accordance to another example of the present disclosure.
FIG. 12 is an enlarged portion of FIG. 11.

Referring now to FIGS. 11-12, an example valve 1100 is illustrated. The valve 1100 includes a valve stem 1102 and a valve head 1104. The valve stem 1102 can have an outer surface with a cylindrical portion and a variably-shaped portion to define a target 1110. The target 1110 can be the variably-shaped portion. The target 1110 can be detected by a proximity sensor (such as sensors 140, 200, 601 and 1000) to determine axial motion of the valve 1100. The valve 1100 is substantially similar to, and can operate in substantially the same manner as, the valve 600 described above.

The target 1110 can be a series of one or more grooves 1112 formed in the valve stem 1102 and arranged in the axial direction along a length of the valve stem 1102. The grooves 1112 can have a square cross-section and be formed by cutting the body portion of the valve stem 1102. A raised portion 1114 can be formed between adjacent grooves 1112. In the illustrated example of FIGS. 11-12, the grooves 1112 are square cut grooves having a substantially square shape. The grooves 1112 and/or raised portions 1114 can be detected by one or more sensors. By detecting and counting the grooves 1112 and/or raised portions 1114, the distance of travel of axial motion of the valve 1100 can be determined. For example only, a sensor can be utilized to detect or count the number of grooves 1112 (or raised portions 1114) that pass the sensor during axial motion of the valve 1100. The size (such as the axial length) of the grooves 1112 can be a known, thus providing a measurement of the distance of travel of the valve 1110. In some embodiments, multiple sensors can be utilized, each of which detecting movement of the valve 1100 by sensing the grooves 1112 or raised portions 1114. The use of multiple sensors can increase the resolution and/or accuracy of the travel distance measurement.

Figures 13, 14:
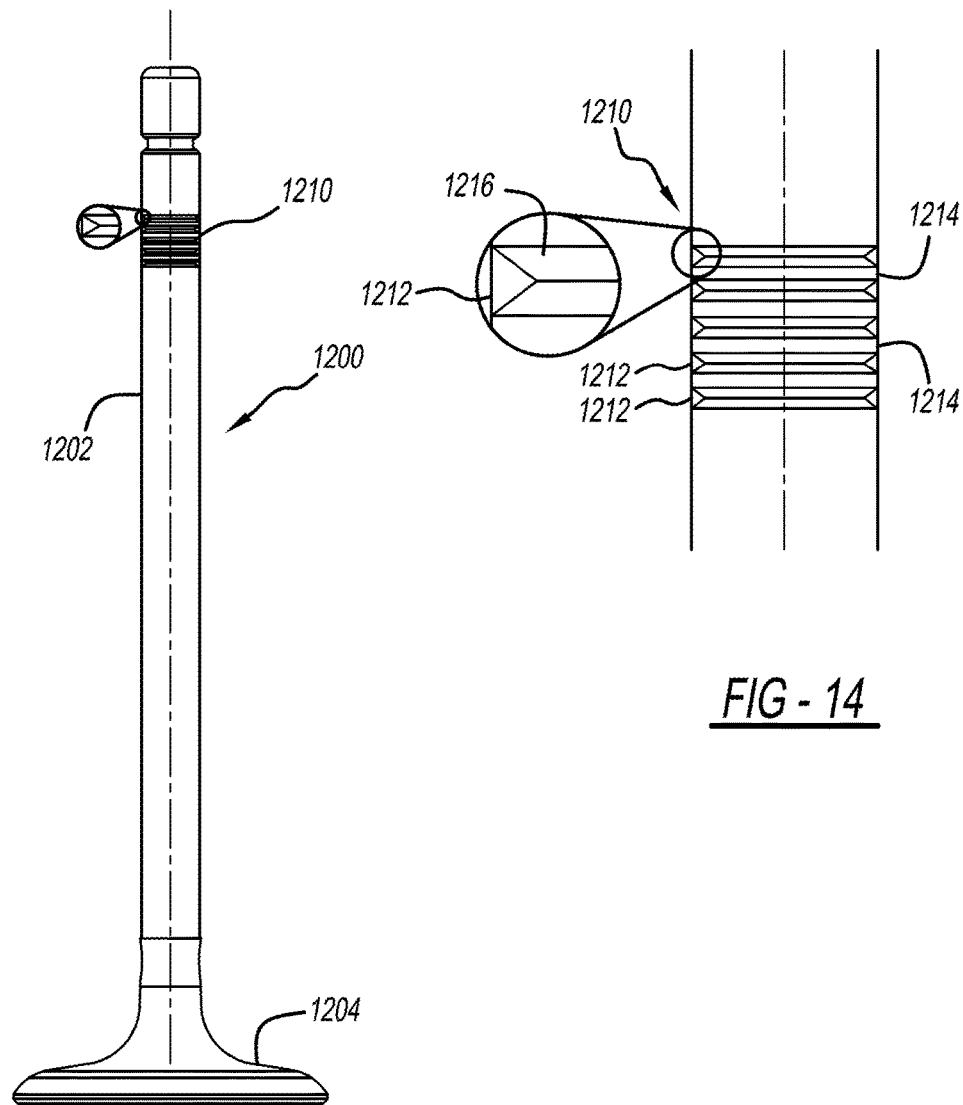
FIG. 13 is a side view of a valve having a sensor target constructed in accordance to another example of the present disclosure.
FIG. 14 is an enlarged portion of FIG. 13.

Referring now to FIGS. 13-14, an example valve 1200 is illustrated. The valve 1200 is substantially similar to, and can operate in substantially the same manner as, the valve 1100 described above. The valve 1200 includes a valve stem 1202 and a valve head 1204. The valve 1200 can also include a target 1210. The target 1210 can be detected by a sensor (such as sensors arranged similarly to sensors 140, 200, 601 and 1000) to determine axial motion of the valve 1200. The target 1210 can be one or more grooves 1212 formed in the valve stem 1202. The grooves 1212 can be formed by cutting the body portion of the valve stem 1202. A raised portion 1214 is formed between adjacent grooves 1212.

In the illustrated example of FIGS. 13-14, the grooves 1212 of the variably-shaped portion of the valve stem 1202 are triangular cut grooves having a substantially triangle shape. As described above in relation to the grooves 1112 and/or raised portions 1114, the grooves 1212 and/or raised portions 1214 can be detected by one or more sensors in order to determine the distance of travel of axial motion of the valve 1200. In order to maintain a substantially consistent or "smooth" outer surface of the valve stem 1202, a filler material 1216 can be inserted into the groove(s) 1212. The quantity of filler material 1216 can be disposed in the series of grooves 1212 and can be arranged to blend with the cylindrical portion of the valve stem 1202. The filler material 1216 can be formed from a welding material, a coating material or any other material that is distinct from the material that forms the valve stem 1212. In some embodiments, the filler material 1216 can be detected by one or more sensors, as described above. It should be appreciated that a filler material 1216 can be utilized with the example valve 1100 described above.

Figures 15, 16:
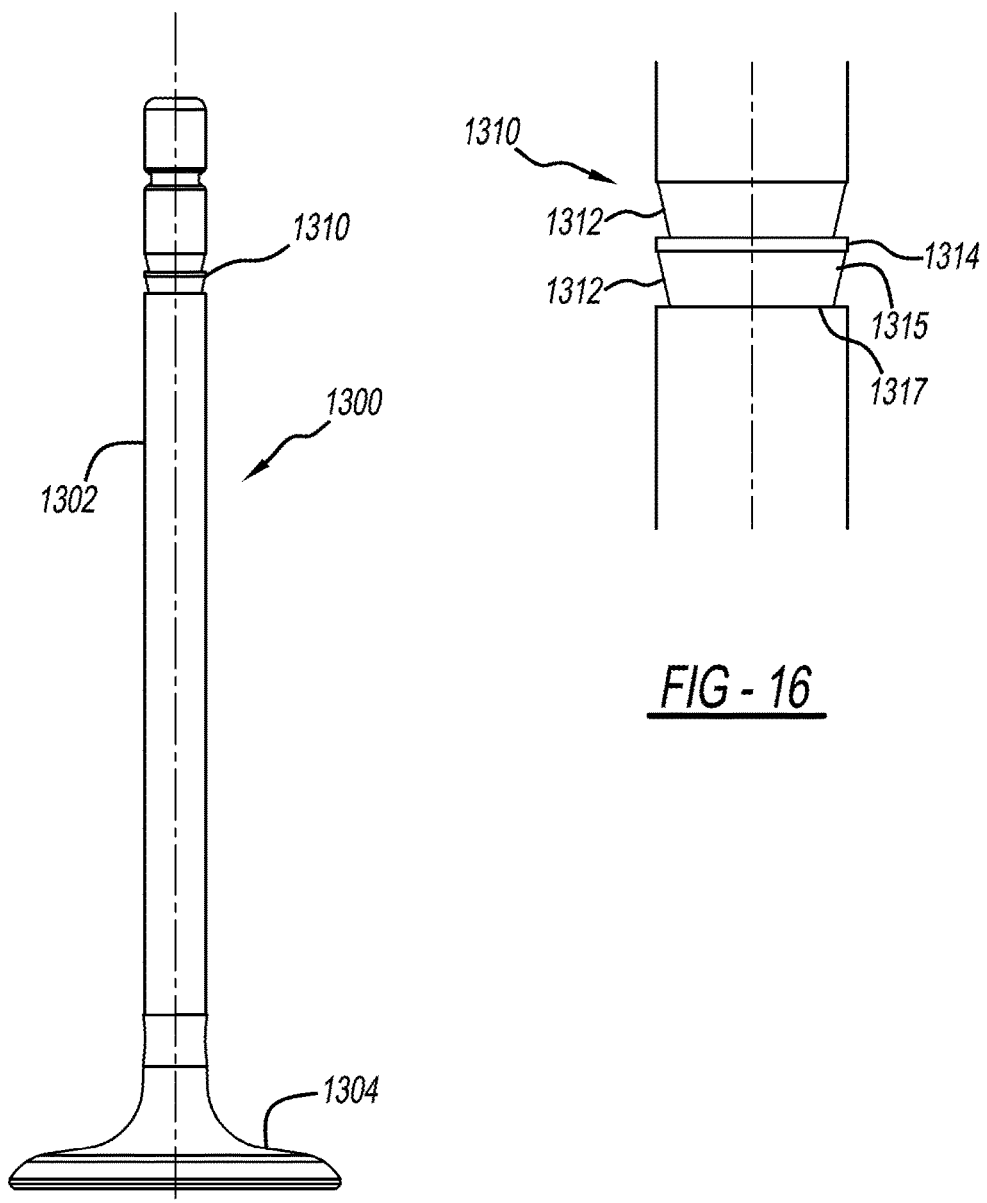
FIG. 15 is a side view of a valve having a sensor target constructed in accordance to another example of the present disclosure.
FIG. 16 is an enlarged portion of FIG. 15.

Yet another example valve 1300 is illustrated in FIGS. 15-16. The valve 1300 is substantially similar to, and can operate in substantially the same manner as, the valves 1100 and 1200 described above. The valve 1300 includes a valve stem 1302 and a valve head 1304. The valve 1300 can also include a target 1310 defined by a variably-shaped portion of the valve stem 1302. The target 1310 can be detected by a sensor (such as sensors arranged similarly to sensors 140, 200, 601 and 1000) to determine axial motion of the valve 1300. The target 1310 can be one or more tapered grooves 1312 formed in the valve stem 1302. The grooves 1312 can be formed by cutting the body portion of the valve stem 1302. A raised portion 1314 is formed between adjacent grooves 1312.

As described above in relation to the grooves 1112, 1212 and/or raised portions 1114 and 1214, the grooves 1312 and/or raised portions 1314 can be detected by one or more sensors in order to determine the distance of travel of axial motion of the valve 1300. In the illustrated example of FIGS. 15-16, the grooves 1312 are tapered from a first end 1315 to a second end 1317 of the groove 1312. The grooves 1312 can be frustoconical sections spaced from one another in the axial direction by the raised portions 1314. The tapered grooves 1312 can increase the resolution and/or accuracy of the travel distance measurement, as described more fully below. It should further be appreciated that a filler material 1216 can be utilized with the example valve 1300 described above.

A sensor (such as the sensors 140 and 200) that is sensitive to changes in magnetic fields can be utilized to detect the targets 1110, 1210 and 1310 described above. In this example, the targets 1110, 1210 and 1310 can include magnetic material, such as in the filler material 1216 or the raised portions 1114, 1214 and 1314. A desirable property for the magnetic filler material can be that it have a different magnetic permeability than the stem material. For example, if the stem material has a high magnetic permeability (like a ferrous steel) then the filler material can be a low magnetic permeability material (like a polymer or a non-magnetic stainless steel or alloy). If the valve stem is stainless steel then the filler material can be a magnetic material. The reason for this is that a magnetic sensor reacts with the magnetic material. If the filler material and the stem were of the same magnetic permeability then the sensor would not detect differences and thus not detect movement. It is also possible to have the stem and filler to both have relatively higher magnetic permeability as long as the magnetic permeabilities are substantially different. It should be appreciated that the present disclosure is not limited to the use of magnetic sensors, and any appropriate type of sensors can be utilized with the present disclosure. For example only, a linear variable differential transformer can be utilized. In further examples, a linear encoder displacement sensor, a Hall-effect sensor, a capacitive sensor, an inductive sensor and an eddy current sensor can be utilized alone or in combination with other sensors.

Figure 17:
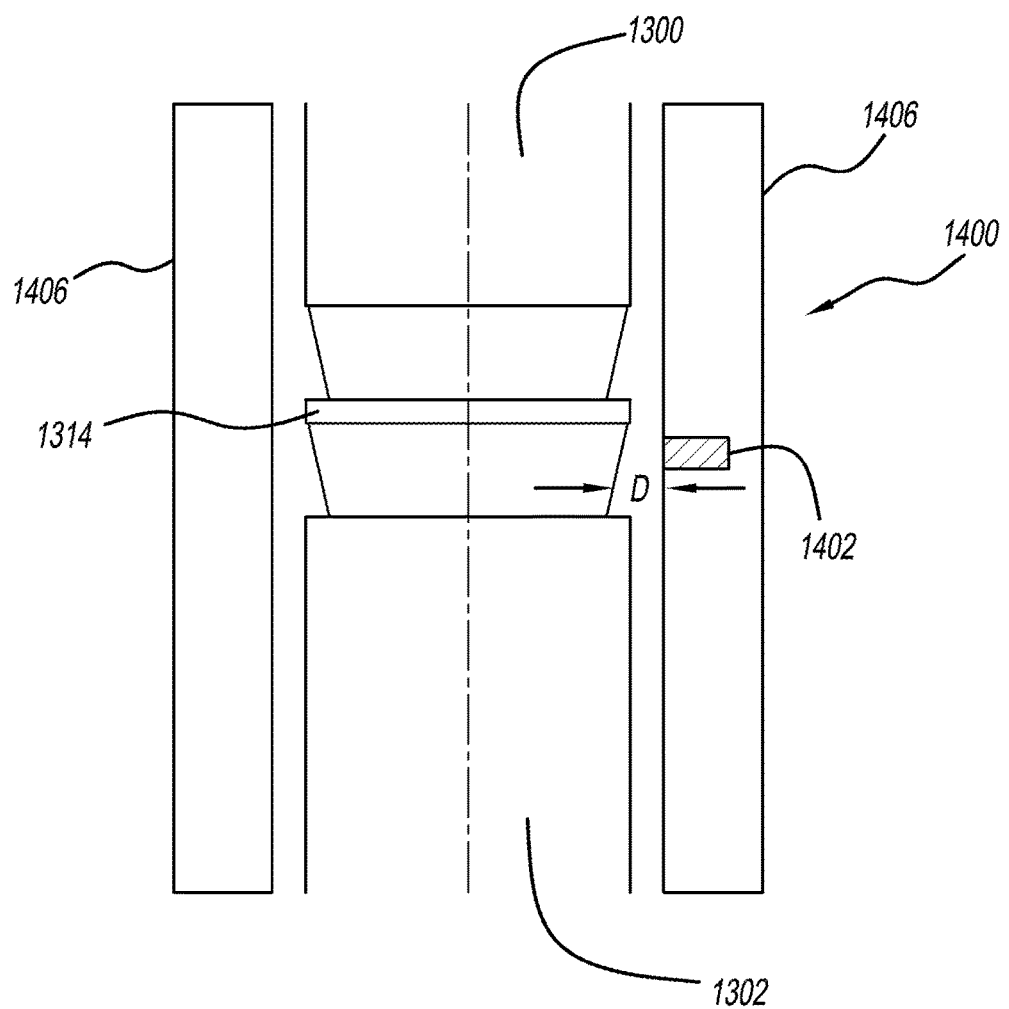
FIG. 17 is a side view of a sensor assembly constructed in accordance to another example of the present disclosure.

Referring now to FIG. 17, an example configuration of a sensor assembly 1400 in combination with the valve 1300 is illustrated. The sensor assembly 1400 can be located in a valve guide 1406 in a substantially similar manner to the examples illustrated in FIGS. 10A and 10B. A sensor 1402 can be any appropriate type of sensor for detecting a distance D between the valve stem 1302 and the valve guide 1406. Tapered grooves 1312 can increase the resolution and/or accuracy of the travel distance measurement. As the valve 1300 moves in an axial direction, the distance D between the sensor assembly 1400 and the tapered groove 1312 in the valve stem will vary. In addition to counting of the grooves 1312 and/or raised portions 1314 (described above), the variation of the distance D can be further correlated to the distance traveled by the valve 1300.

Figure 18:
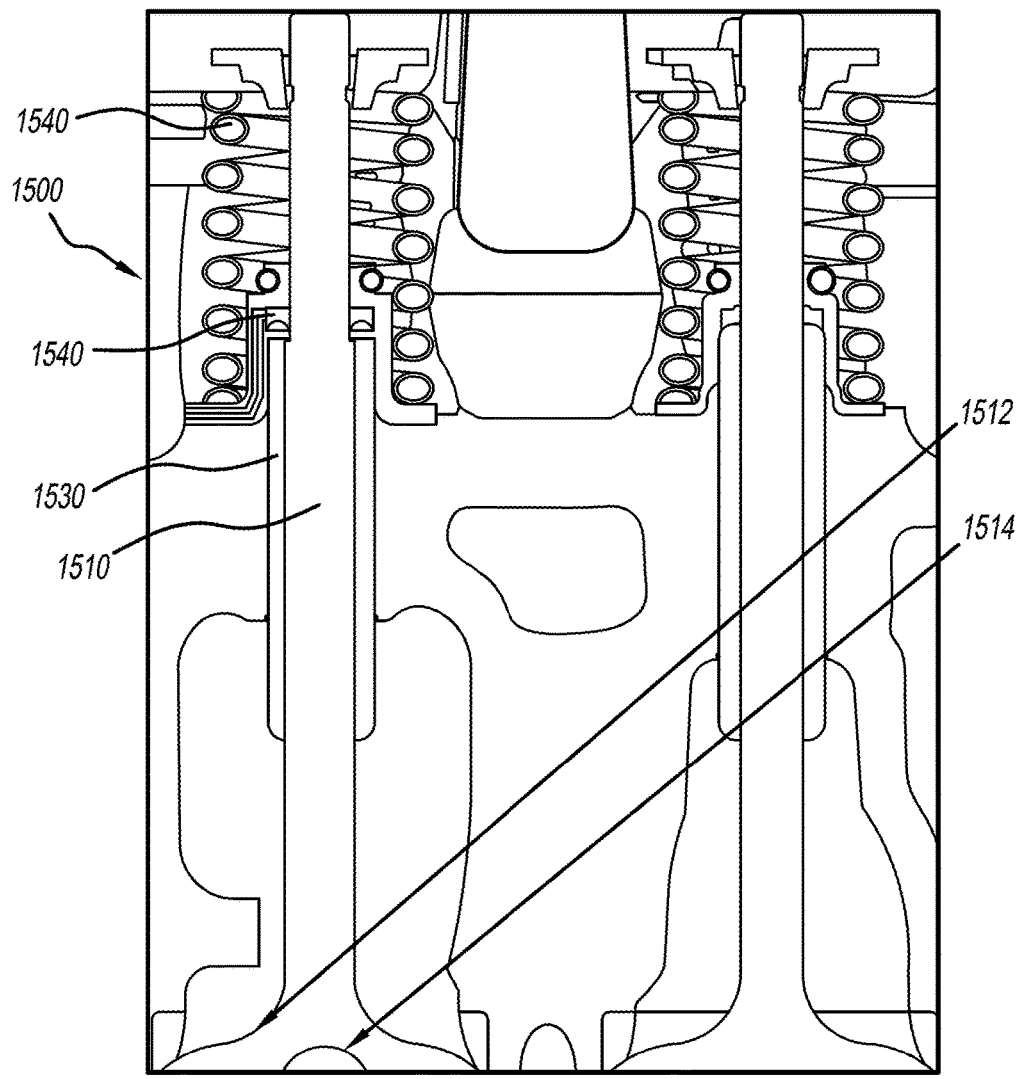
FIG. 18 is a cross-sectional view of a displacement detection device constructed in accordance to another example of the present disclosure.
Figure 19:
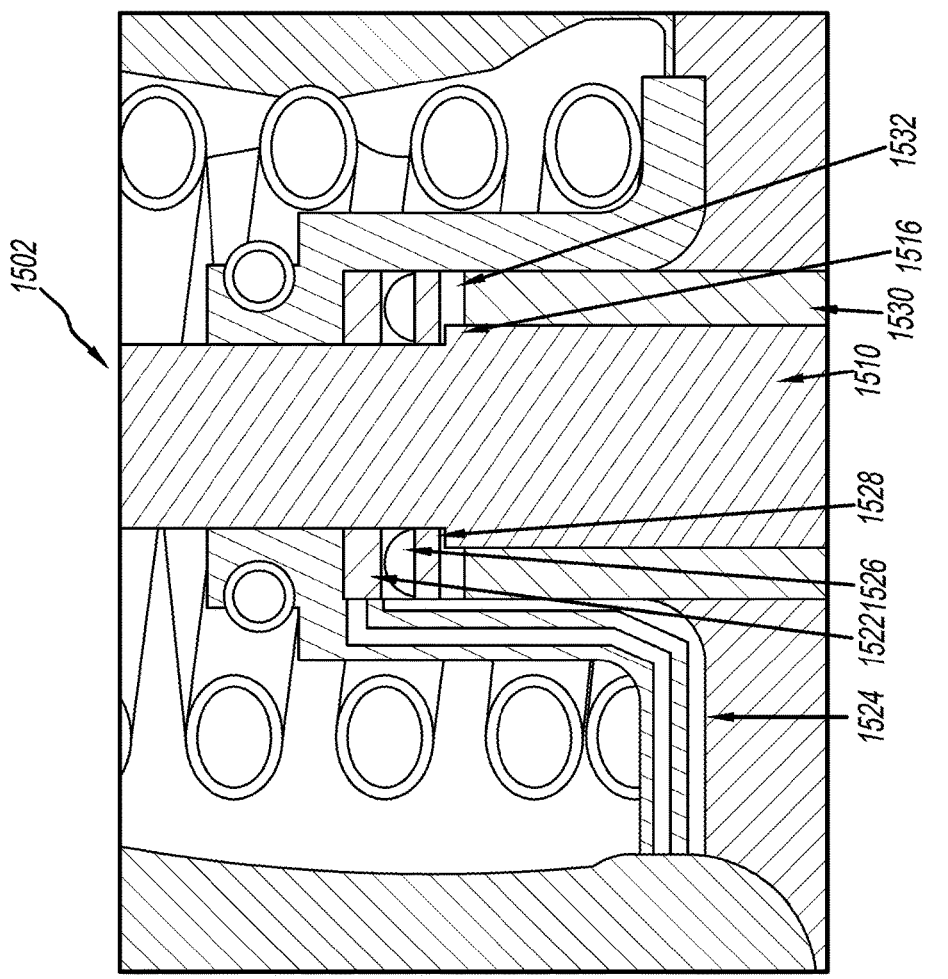
FIG. 19 is an enlarged portion of FIG. 18 in a first configuration.
Figure 20:
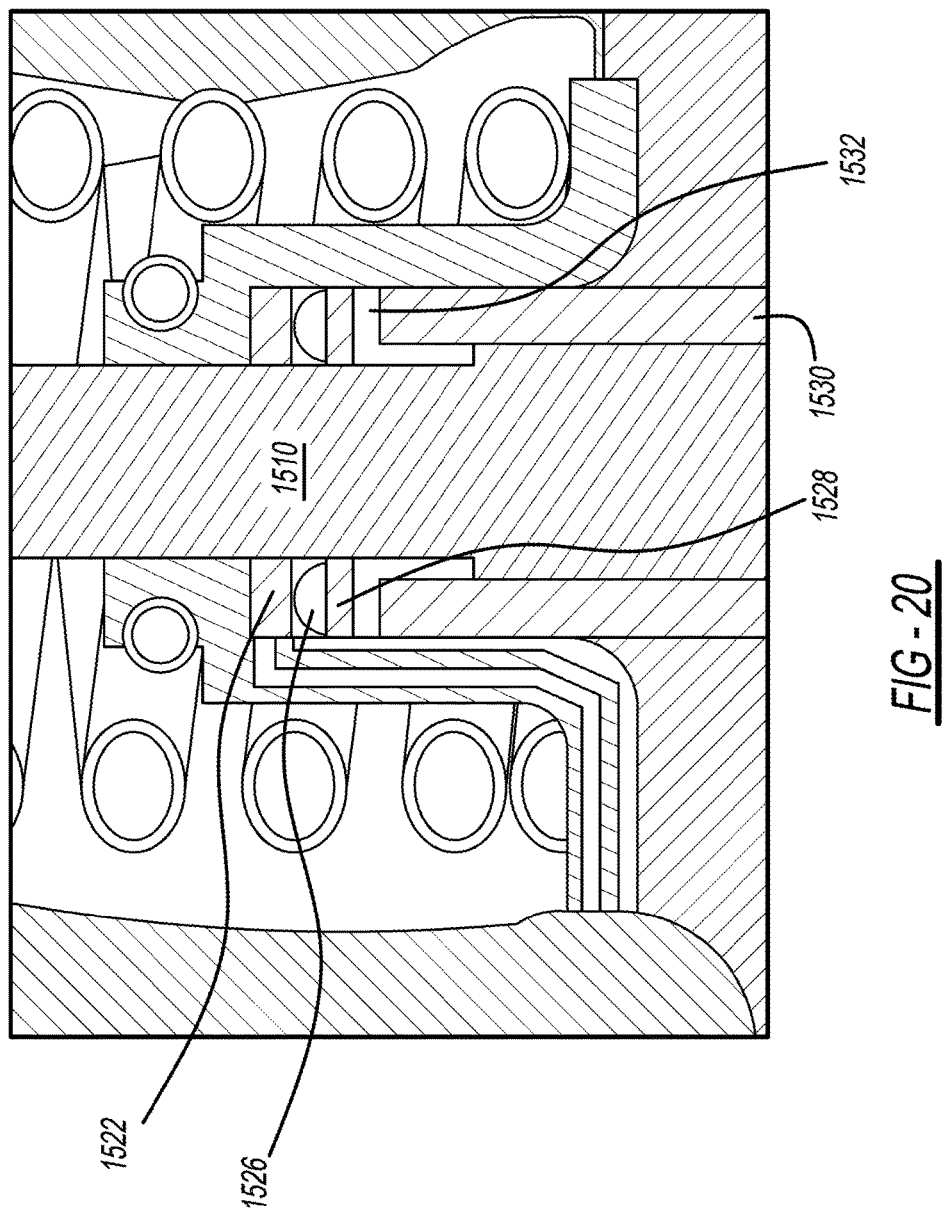
FIG. 20 is an enlarged portion of FIG. 18 in a second configuration.

Referring now to FIGS. 18-20, another example pressure and temperature detection device 1500 according to some embodiments of the present disclosure is illustrated. In this example, a valve 1510 is shown as having a valve head 1512 that defines a recess 1514 similar to the valve head 900 and recess 904 described above. It should be appreciated that other configurations for the valve head 1512 could be used. The example valve 1510 also includes a valve stem 1502 having first and second diameter portions with a shoulder or stepped portion 1516 defined between the first and second diameter portions that interacts with a force sensor, load sensor, or pressure sensor, such as a sensor assembly 1520 having a pressure sensor as further described below. The sensor assembly 1520 can be installed in the internal combustion engine adjacent to the shoulder 1516 of the valve stem 1502 and be configured to detect axial displacement of the valve stem 1502 resulting from one of a change in temperature of the valve stem 1502 and a change in pressure acting on a valve face (not shown) of the valve 1510. A valve guide 1530 may further be included in the device, e.g., to assist in the proper arrangement of the valve 1510 within an internal combustion engine.

With particular reference to FIGS. 19-20, the sensor assembly 1520 can include a pressure sensor 1522, one or more sensor wires 1524, a spring 1526, and a plate 1528. The pressure sensor 1522 can be spaced from the shoulder 1516. The plate 1528 can be positioned to engage the shoulder 1516. The spring 1526 can be positioned between the plate 1528 and the pressure sensor 1522. The pressure sensor 1522, the spring 1526, and the plate 1528 can encircle the valve stem 1502. The pressure sensor 1522 can be arranged to be coupled to the spring 1526, which is coupled to the plate 1528. The pressure sensor 1522 can be any type of force transducer configured to detect and output a measurement of a force exerted on the pressure sensor 1522, for example, a piezoelectric sensor or a strain gauge sensor. The pressure sensor 1522 can be communicatively coupled to an Engine Control Unit or other controller (not shown) by one or more sensor wires 1524. The Engine Control Unit or other controller can utilize the output of the pressure sensor 1522 to detect the displacement of the valve 1510 and thereby determine the in-cylinder pressure and/or temperature, as described more fully below.

The spring 1526 can, e.g., be a compliant spring with a preload compliance that is much less than the preload compliance of a valve spring 1540 coupled to the valve 1510. Further, the strength of the spring 1526 can be such that the spring 1526 will not "bottom out" (e.g., allow direct contact between the sensor 1522 and the plate 1528) during all expected operating conditions of the engine. For example, the valve stem 1502 can be moveable over a predetermined range of axial movement and the spring 1526 can be sized to be compressible over the entire predetermined range. The spring 1526 can be coupled to the plate 1528, which comes into contact with the stepped portion 1516 of the valve 1510. The spring 1526 can provide a resistance to the force exerted by the stepped portion 1516 during impact with the bottom plate 1528, which may protect the pressure sensor 1522 from damage. In some embodiments, an air gap 1532 is defined between the plate 1528 of the sensor assembly 1520 and the valve guide 1530 in certain configurations. In some embodiments the plate 1528 can continuously contact the shoulder 1516 and in some embodiments the plate 1528 can intermittently contact the shoulder 1516. The air gap 1532 can allow for a certain amount of travel, while also maintaining proper positioning of, the plate 1528 in an unloaded condition (see FIG. 20).

FIG. 19 shows the device 1500 in a first configuration in which the valve 1510 is in a closed position. In this first configuration, the stepped portion 1516 of the valve 1510 is in contact with the plate 1528 and exerts a force on the pressure sensor 1522 (e.g., through spring 1526). The force measured by the pressure sensor 1522 can be calibrated to correlate to the in-cylinder pressure and/or temperature of the engine, similar to the correlation between the displacement of the valve in the closed position described above. FIG. 20 shows the device 1500 in a second configuration in which the valve 1510 is in an open position. In this second configuration, the stepped portion 1516 of the valve 1510 is out of contact with the plate 1528 and does not exert a force on the pressure sensor 1522 (e.g., through spring 1526).

Figure 21:
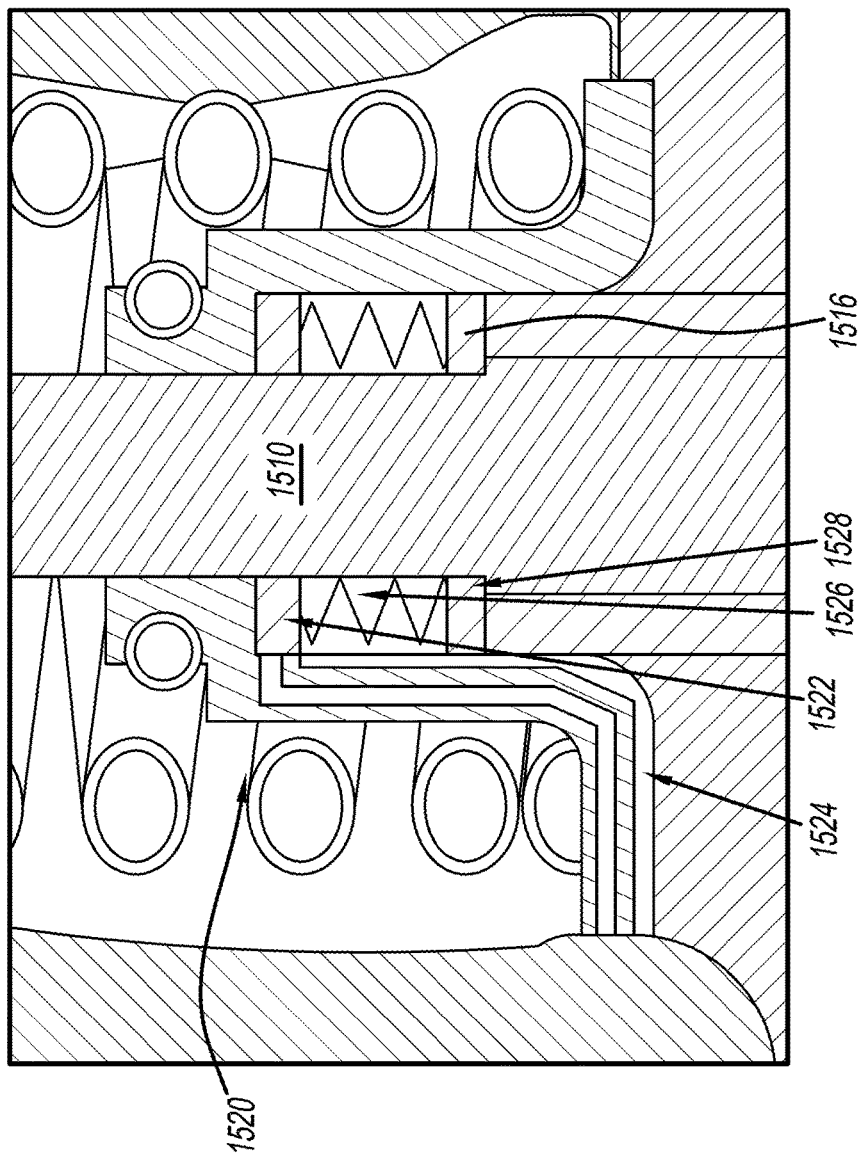
FIG. 21 is a cross-sectional view of a displacement detection device constructed in accordance to another example of the present disclosure.

In an alternative embodiment shown in FIG. 21, however, the spring 1526 can be constructed to allow the plate 1528 to stay in contact with the stepped portion 1516 of the valve 1510 during normal operating conditions of the engine. In this example, the spring 1526 can be constructed to have a non-linear spring rate such that further compression of the spring 1526 (e.g., during the closing of the valve 1510) increases its mechanical resistance. In this manner, damage to the pressure sensor 1522 from impact with the valve 1510 can be reduced.

It can also be desirable to incorporate a low cost sensor/transducer into an engine valvetrain system, remote from the valve stem, in order to determine pressure in a combustion chamber. The present disclosure also proposes a method and system to measure that deflection of an engine valve that is calibrated to the variation in engine combustion pressure so the entire system is able to measure cylinder pressure in real time.

The present disclosure provides a method of monitoring of the displacement of the engine valve under the combustion pressure through a contact mechanism contained within the valvetrain to monitor and measure stress and/or strain as a function (transfer function) of the combustion pressure. Such a system can provide improved fidelity over alternative methods and systems.

The present disclosure also provides a low cost combustion pressure sensor for the internal combustion engine using an embedded load cell having positive contact with a feature of the valvetrain to measure displacement and to also zero the measurement. A load cell that can act as a sensor is utilized to monitor the valve displacement as a function of combustion pressure. The sensor can be a strain gage (using bonded foil strain gauges, piezo-resistive strain gauges, etc.) or a piezoelectric strain sensor. Alternatively, a Hall Effect sensor or inductive pick-up sensor could be utilized.

The sensor can contact a moveable portion of a valvetrain system (e.g., the hydraulic lash adjuster mechanism) to ensure sensitivity and fidelity to the small deflections expected within the combustion sensing event. Alternative locations for the load cell contact include the load-bearing pivot point and/or the load-bearing lash adjuster point. Since the mechanism is through a load-measuring linkage and not through a load cell in compression within the valve stem, the system need not necessarily include compression springs to absorb impact.

The positive contact between the load cell and the valvetrain system allows the measurement to be "zeroed" for each engine cycle since the position of the valve will be known at a given time in the engine cycle, for example when the intake valve closes. The load cell/valvetrain position at intake valve closing could be called $x_0$ and then any subsequent deflection of the valve stem from engine combustion pressure (when the valve is closed) would be measured relative to $x_0$. Similarly, the positive contact from a hydraulic lash adjuster-load cell system allows tolerance stack-ups that are unique to each engine installation to be accounted for. A hydraulic lash adjuster-load cell on each engine would have a unique $x_0$ position and valve stem deflection for that engine would be measured relative to $x_0$. Thus, the sensor can be "zeroed" for each engine and for each engine cycle. The ability to "zero" the sensor with a new $x_0$ for each engine cycle can compensate for wear of engine components over time, thus avoiding sensor accuracy degradation over time.

Figure 22:
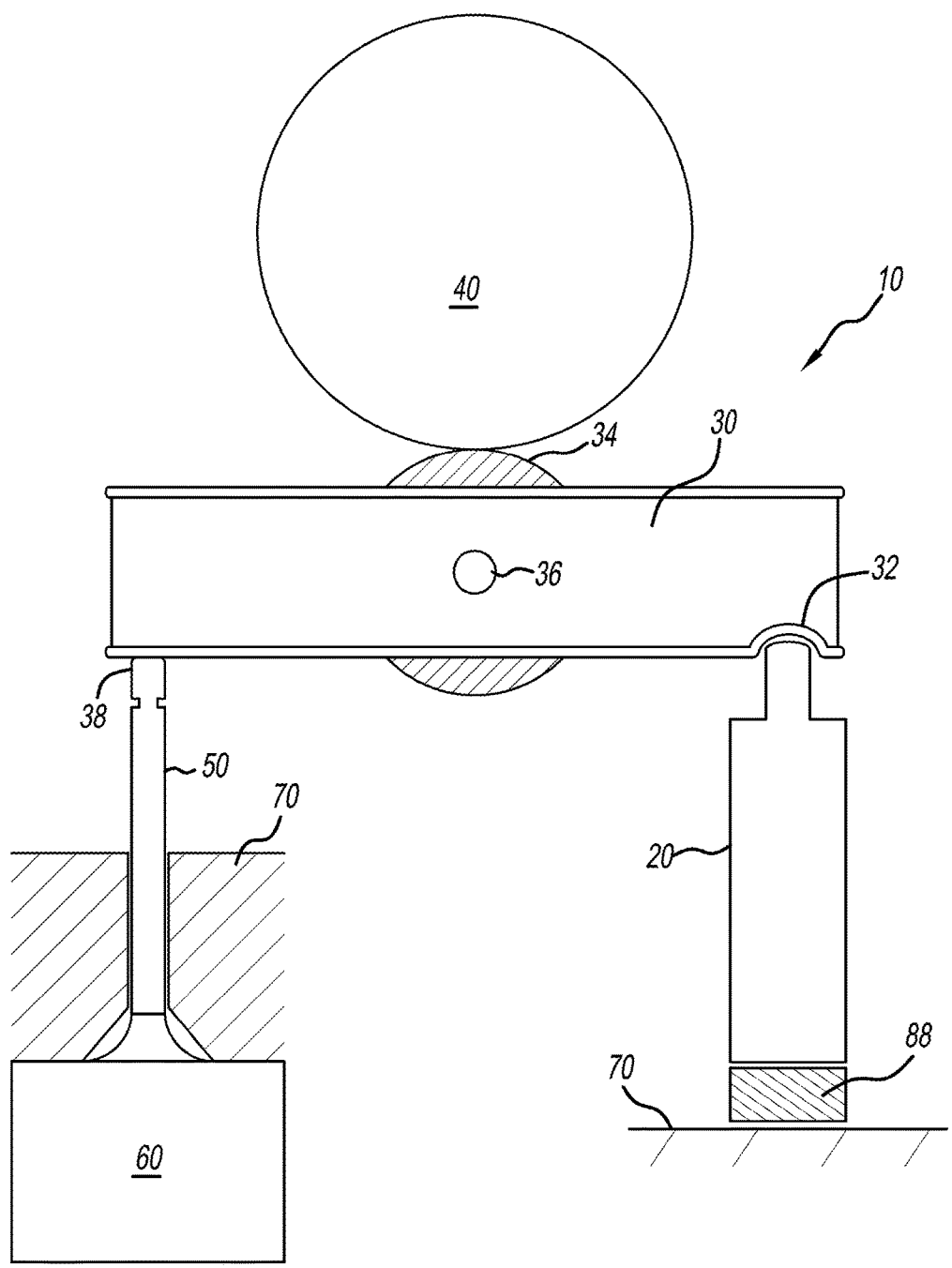
FIG. 22 is a schematic illustration of an internal combustion engine including a detection device for measuring the pressure within a combustion chamber constructed in accordance to another example of the present disclosure.

Referring now to FIG. 22, an example of an in-cylinder pressure measurement system installed in an internal combustion engine according to some embodiments of the present disclosure is illustrated. The engine 10 can include a hydraulic lash adjuster 20 in communication with a rocker arm assembly 30. The rocker arm assembly 30 is in communication with a camshaft 40 and an engine valve 50 (such as an intake or exhaust valve). The rocker arm assembly 30 can include a first portion 32 that contacts the hydraulic lash adjuster 20 during engine operation. The rocker arm assembly 30 can further include a roller 34 that is coupled to the remainder of the rocker arm assembly by roller axle 36. The roller axle 36 permits the roller 34 to rotate about an axis. The rocker arm assembly 30 can also include a second portion that contacts the valve 50. Through rotation of the camshaft 40 and its interaction with the rocker arm assembly 30, the valve 50 can be selectively opened and closed to communicate with a combustion chamber defined by an engine structure 70 (such as an engine block).

In various embodiments of the present disclosure, and as shown in FIG. 22, a sensor 88 can be arranged between a bottom portion of the hydraulic lash adjuster 20 and the engine structure 70. The sensor 88 can provide a signal indicative of the pressure within the combustion chamber 60 of the engine 10. For example only, the sensor 88 can measure a force exerted on the hydraulic lash adjuster 20, which can be correlated to pressure and/or temperature within the combustion chamber 60. As described above, various different types of sensors can be utilized (bonded foil strain gauges, piezo-resistive strain gauges, piezoelectric strain sensors, etc.).

Figure 23:
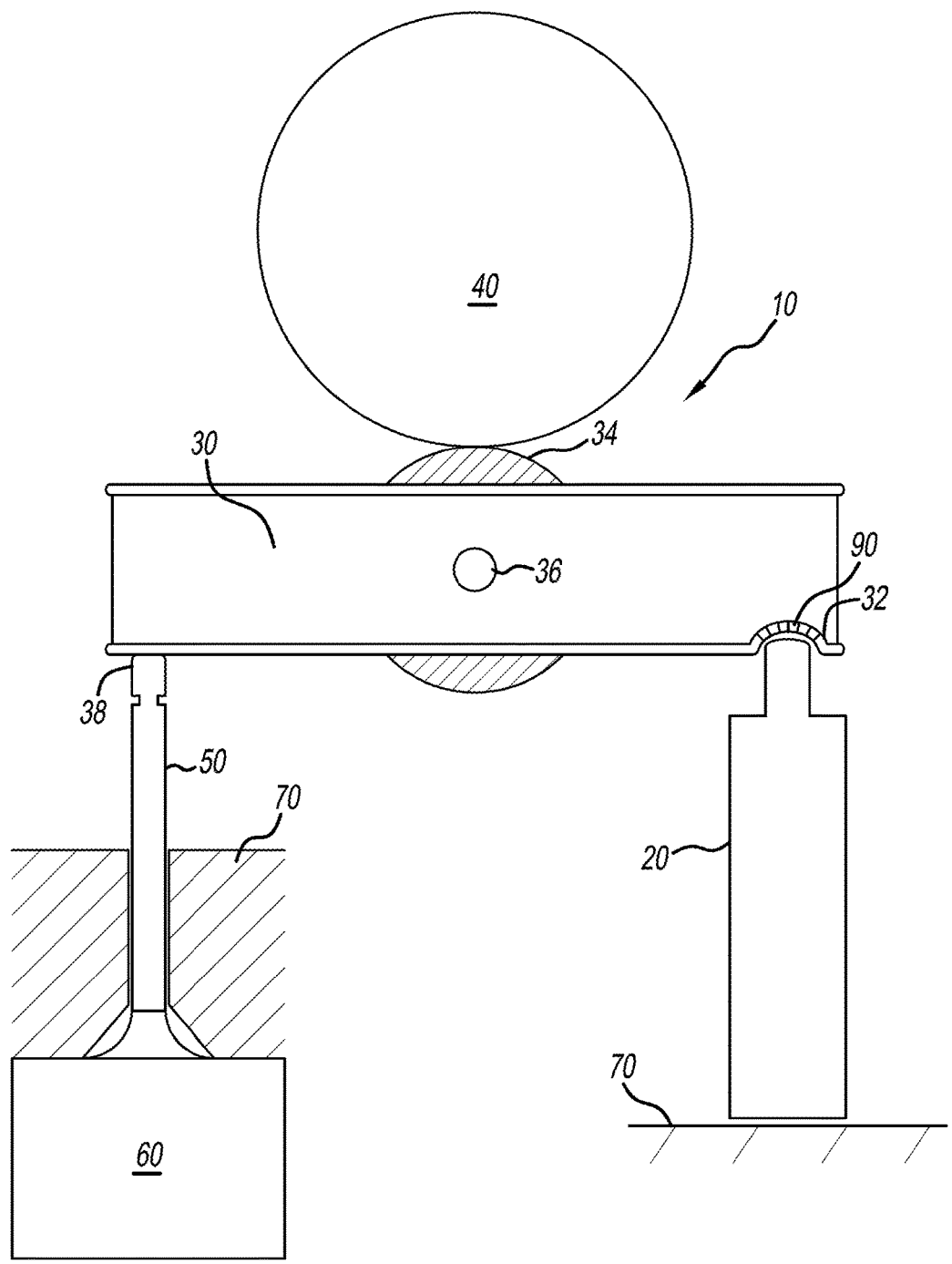
FIG. 23 is a schematic illustration of an internal combustion engine including a detection device for measuring the pressure within a combustion chamber constructed in accordance to another example of the present disclosure.

Referring now to FIG. 23, another example in-cylinder pressure measurement system installed in an internal combustion engine according to some embodiments of the present disclosure is illustrated. While very similar to the system illustrated in FIG. 22 and described above, the example system of FIG. 23 includes a sensor 90 that is arranged between the hydraulic lash adjuster 20 and the rocker arm assembly 30. The sensor 90 can provide a signal indicative of the pressure within the combustion chamber 60 of the engine 10. For example only, the sensor 90 can measure a force exerted on the hydraulic lash adjuster 20 and/or rocker arm assembly 30, which can be correlated to pressure and/or temperature within the combustion chamber 60. The sensor 90 can be coupled with the rocker arm assembly 30 or the hydraulic lash adjuster 20.

Figure 24:
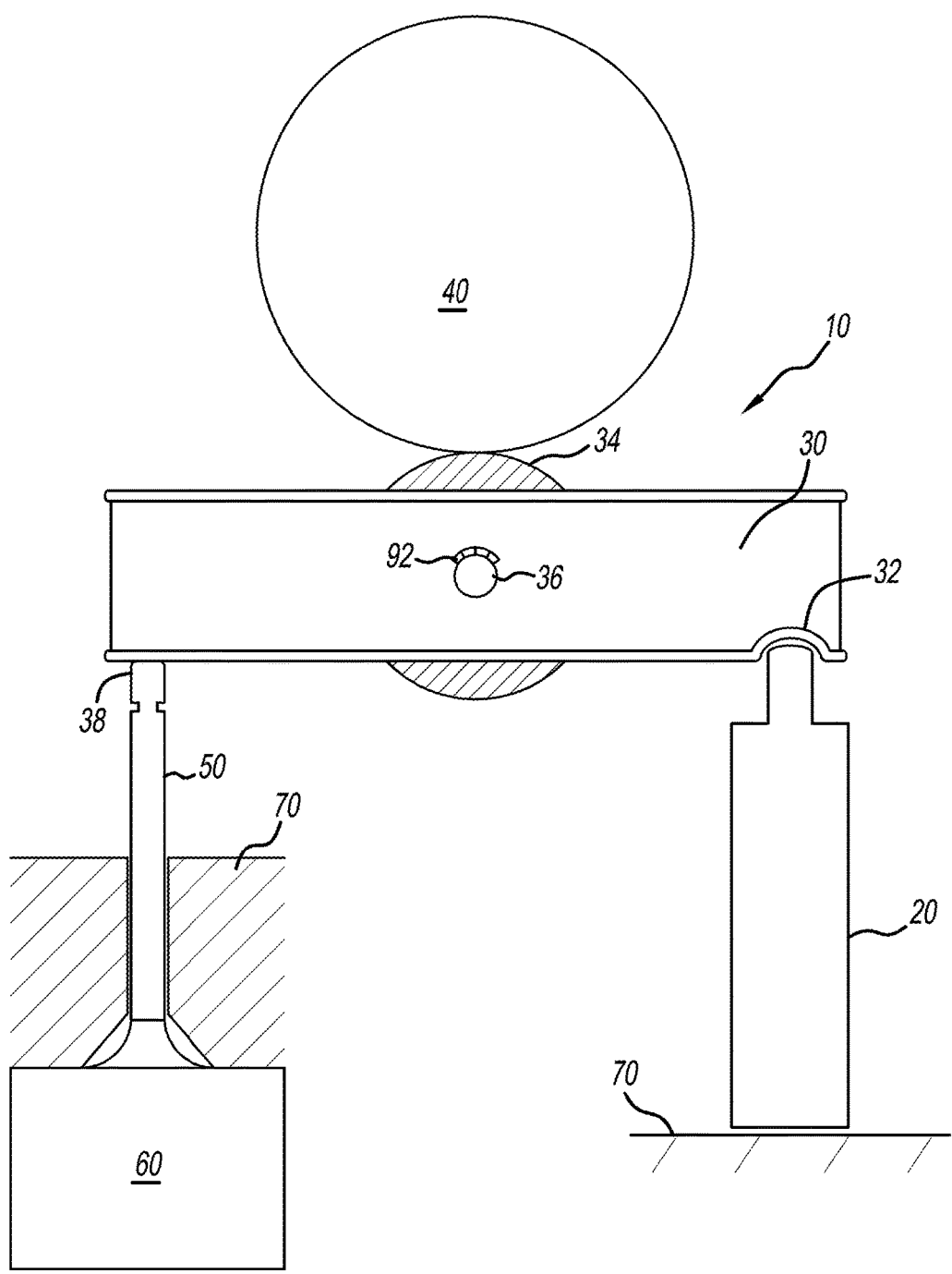
FIG. 24 is a schematic illustration of an internal combustion engine including a detection device for measuring the pressure within a combustion chamber constructed in accordance to another example of the present disclosure.

Referring now to FIG. 24, another example in-cylinder pressure measurement system installed in an internal combustion engine according to some embodiments of the present disclosure is illustrated. While very similar to the systems illustrated in FIGS. 22 and 23 and described above, the example system of FIG. 24 includes a sensor 92 that is arranged upon the axle 36 of the roller 34 of the rocker arm assembly 30. The sensor 92 can provide a signal indicative of the pressure within the combustion chamber 60 of the engine 10. For example only, the sensor 92 can measure a force exerted on the rocker arm assembly 30, which can be correlated to pressure and/or temperature within the combustion chamber 60.

Figure 25:
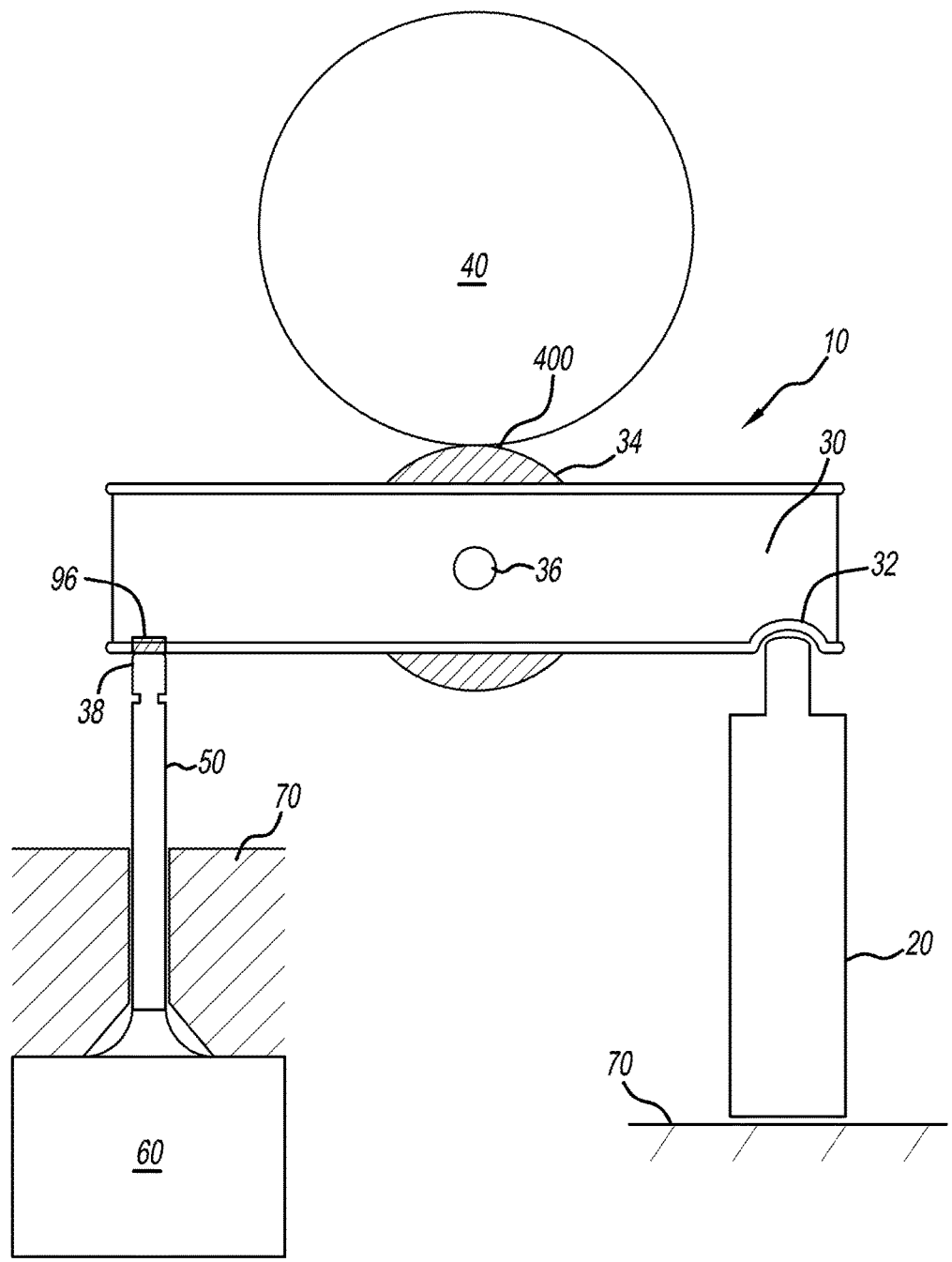
FIG. 25 is a schematic illustration of an internal combustion engine including a detection device for measuring the pressure within a combustion chamber constructed in accordance to another example of the present disclosure.

Referring now to FIG. 25, another example in-cylinder pressure measurement system installed in an internal combustion engine according to some embodiments of the present disclosure is illustrated. While very similar to the systems illustrated in FIGS. 22-24 and described above, the example system of FIG. 25 includes a sensor 96 that is arranged between the rocker arm assembly 30 and the valve 50. The sensor 96 can provide a signal indicative of the pressure within the combustion chamber 60 of the engine 10. For example only, the sensor 96 can measure a force exerted on the rocker arm assembly 30 by the valve 50, which can be correlated to pressure and/or temperature within the combustion chamber 60. The sensor 96 can be coupled with the rocker arm assembly 30.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

While the present disclosure illustrates various aspects of the present teachings, and while the present teachings have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing teachings are illustrative, and no single feature or element is essential to all possible combinations that may be claimed in this or a later application.

What is claimed is:

1. An apparatus for measuring at least one of temperature and pressure within a cylinder of an internal combustion engine comprising:
   an engine valve having a valve head and a valve stem extending from the valve head in an axial direction, the valve head having a valve face configured to be in pressure communication with an engine cylinder, the valve stem configured to extend through an opening in a valve guide secured to an engine block of the internal combustion engine, the valve stem having an outer surface with a cylindrical portion and a variably-shaped portion; and
   a proximity sensor installed in the internal combustion engine adjacent to the variably-shaped portion of the outer surface of the valve stem, the proximity sensor configured to detect axial displacement of the valve stem resulting from one of a change in temperature of the valve stem and a change in pressure acting on the valve face.

2. The apparatus of claim 1 wherein the variably-shaped portion is further defined as a series of grooves arranged in the axial direction along a length of the valve stem.

3. The apparatus of claim 2 wherein at least some of the series of grooves are triangular in cross-section.

4. The apparatus of claim 2 wherein at least some of the series of grooves are square in cross-section.

5. The apparatus of claim 2 further comprising:
   a quantity of filler material disposed in the series of grooves and arranged to blend with the cylindrical portion of the valve stem.

6. The apparatus of claim 5 wherein the quantity of filler material has a magnetic permeability substantially equal to one and the stem has a magnetic permeability greater than one.

7. The apparatus of claim 5 wherein the quantity of filler material has a magnetic permeability greater than one and the stem has a magnetic permeability substantially equal to one.

8. The apparatus of claim 5 wherein the quantity of filler material and the stem both have a magnetic permeability greater than one but different from one another.

9. The apparatus of claim 1 wherein the variably-shaped portion is further defined as at least one frustoconical section along a length of the valve stem.

10. An apparatus for measuring at least one of temperature and pressure within a cylinder of an internal combustion engine comprising:
   an engine valve having a valve head and a valve stem extending from the valve head in an axial direction, the valve head having a valve face configured to be in pressure communication with an engine cylinder, the valve stem configured to extend through an opening in a valve guide secured to an engine block of the internal combustion engine, the valve stem having first and second diameter portions with a shoulder defined between the first and second diameter portions; and
   a sensor assembly installed in the internal combustion engine adjacent to the shoulder of the valve stem, the sensor assembly configured to detect axial displacement of the valve stem resulting from one of a change in temperature of the valve stem and a change in pressure acting on the valve face.

11. The apparatus of claim 10 wherein the sensor assembly further comprises:
   one of a pressure sensor and a force sensor spaced from the shoulder;
   a plate positioned to engage the shoulder; and
   a spring positioned between the plate and the one of the pressure sensor and the force sensor.

12. The apparatus of claim 11 wherein the one of the pressure sensor and the force sensor, the spring, and the plate encircle the valve stem.

13. The apparatus of claim 11 wherein the plate continuously contacts the shoulder.

14. The apparatus of claim 11 wherein the plate intermittently contacts the shoulder.

15. The apparatus of claim 11 wherein the valve stem is moveable over a predetermined range of axial movement and wherein the spring is sized to be compressible over the entire predetermined range.

* * * * *